(12) United States Patent
McGuire et al.

(10) Patent No.: US 12,262,691 B2
(45) Date of Patent: Apr. 1, 2025

(54) ANIMAL CALMING VEST SYSTEM AND METHOD

(71) Applicant: Canada Pooch Ltd., Toronto (CA)

(72) Inventors: Danielle McGuire, Toronto (CA); Casey Barber, Toronto (CA)

(73) Assignee: CANADA POOCH LTD., Toronto (CA)

( * ) Notice: Subject to any disclaimer, the term of this patent is extended or adjusted under 35 U.S.C. 154(b) by 0 days.

(21) Appl. No.: 18/385,039

(22) Filed: Oct. 30, 2023

(65) Prior Publication Data

US 2024/0147961 A1 May 9, 2024

Related U.S. Application Data

(63) Continuation-in-part of application No. 29/858,782, filed on Nov. 3, 2022.
(Continued)

(51) Int. Cl.
*A01K 13/00* (2006.01)
*A61D 9/00* (2006.01)

(52) U.S. Cl.
CPC .............. *A01K 13/006* (2013.01); *A61D 9/00* (2013.01)

(58) Field of Classification Search
CPC .............................. A01K 13/006; A01K 13/00
See application file for complete search history.

(56) References Cited

U.S. PATENT DOCUMENTS

| 645,368 A | * | 3/1900 | Mitchell | ............. | A01K 13/006 |
| | | | | | 34/65 |
| 4,672,722 A | | 6/1987 | Malamed | | |

(Continued)

FOREIGN PATENT DOCUMENTS

| AU | 343933 S | 8/2012 |
| AU | 362167 S | 6/2015 |

(Continued)

OTHER PUBLICATIONS

ActiveDogs, "ActiveDogs Weighted K9 Dog Collar w/Sheepskin Padding," Amazon.com, Jan. 15, 2019, retrieved on Feb. 20, 2024 from https://epoch.pet/2018/09/08/xdog-weight-and-fitness-vest-product-review-with-10-off-code/, 31 pages.
(Continued)

*Primary Examiner* — Tien Q Dinh
*Assistant Examiner* — Nevena Aleksic
(74) *Attorney, Agent, or Firm* — Davis Wright Tremaine LLP

(57) ABSTRACT

A method of calming an animal with an animal calming vest that includes disposing the animal calming vest on the back of the animal. The animal calming vest includes a jacket, a first pair of coupling arms extending from the jacket, a second pair of coupling arms extending from the jacket, a collar extending from the jacket, and a collar weight disposed within an internal collar cavity of the collar. The method further includes releasably coupling the first pair of coupling arms of the animal calming vest about the neck and chest of the animal; and releasably coupling the second pair of coupling arms of the animal calming vest about the torso of the animal. Coupling the animal calming vest about the animal generates a calming effect in the animal.

19 Claims, 25 Drawing Sheets

Related U.S. Application Data

(60) Provisional application No. 63/422,346, filed on Nov. 3, 2022.

(56) References Cited

U.S. PATENT DOCUMENTS

| | | | |
|---|---|---|---|
| 5,060,458 | A | 10/1991 | Curtis |
| 5,243,991 | A | 9/1993 | Marks |
| 5,361,563 | A | 11/1994 | Llamas |
| 6,662,754 | B1 | 12/2003 | Wilson |
| 7,637,087 | B1 | 12/2009 | Graham |
| 8,291,867 | B2 | 10/2012 | Blizzard |
| D677,020 | S | 2/2013 | Blizzard |
| D677,021 | S | 2/2013 | Blizzard |
| D683,083 | S | 5/2013 | Blizzard |
| 8,459,211 | B2 | 6/2013 | Blizzard |
| 8,899,189 | B2 | 12/2014 | Blizzard |
| 9,155,286 | B2 * | 10/2015 | Wickens .............. A01K 15/027 |
| D757,376 | S | 5/2016 | Blizzard |
| 9,468,195 | B2 | 10/2016 | Blizzard et al. |
| 9,474,251 | B2 | 10/2016 | Blizzard |
| 9,810,256 | B2 | 11/2017 | Blizzard et al. |
| D805,265 | S | 12/2017 | Blizzard |
| 9,877,465 | B2 | 1/2018 | Blizzard et al. |
| 2003/0177984 | A1 * | 9/2003 | Newman .............. A01K 15/027 |
| | | | 119/850 |
| 2005/0013851 | A1 | 1/2005 | Sharpe |
| 2005/0284418 | A1 * | 12/2005 | Benefiel .............. A01K 13/006 |
| | | | 119/850 |
| 2008/0067163 | A1 | 3/2008 | Axinte et al. |
| 2009/0120377 | A1 | 5/2009 | Palmer |
| 2013/0186348 | A1 | 7/2013 | Blizzard |
| 2019/0200573 | A1 * | 7/2019 | Smith ................ A41D 13/0015 |
| 2023/0247968 | A1 * | 8/2023 | Maremont ........... A01K 13/006 |
| | | | 119/792 |

FOREIGN PATENT DOCUMENTS

| | | |
|---|---|---|
| AU | 2010260315 B2 | 6/2016 |
| CA | 220254 A | 6/1922 |
| CA | 2765747 A1 | 12/2010 |
| CA | 146509 S | 2/2013 |
| CA | 2889915 A1 | 5/2014 |
| CN | 102802406 A | 11/2012 |
| EP | 2442638 A2 | 4/2012 |
| EP | 2804471 A2 | 11/2014 |
| EP | 2904899 A1 | 8/2015 |
| JP | 5384736 B2 | 1/2014 |
| JP | 6106060 B2 | 3/2017 |

OTHER PUBLICATIONS

International Search Report and Written Opinion mailed Jan. 26, 2024, Patent Application No. PCT/IB2023/061002, 13 pages.
XDOG, "XDOG Weight Vest Harness for Dogs," Amazon.com, Nov. 13, 2017, retreived on Feb. 20, 2024 from https://www.amazon.com/Xdog-Behavior-Harness-Performance-Compression/dp/B077DWNVPQ, 12 pages.
EUIPO Certificate of Registration No. 015013737-0001 dated Mar. 9, 2023, 5 pages.
EUIPO Certificate of Registration No. 015013737-0002 dated Mar. 9, 2023, 5 pages.
UK IPO Certificate of Registration for UK Design No. 6267156, Mar. 16, 2023, 5 pages.
UK IPO Certificate of Registration for UK Design No. 6267157, Mar. 16, 2023, 5 pages.

* cited by examiner

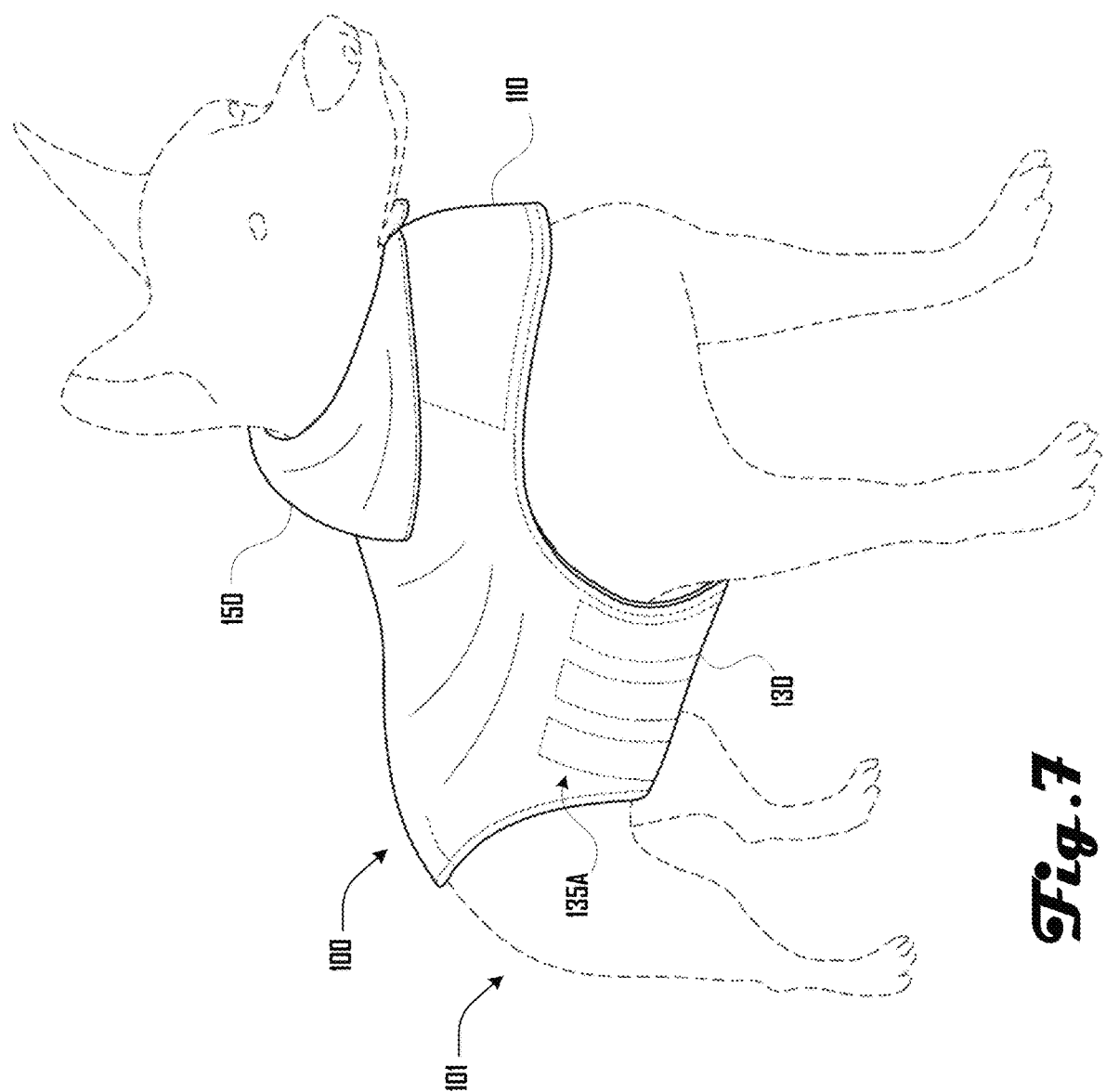

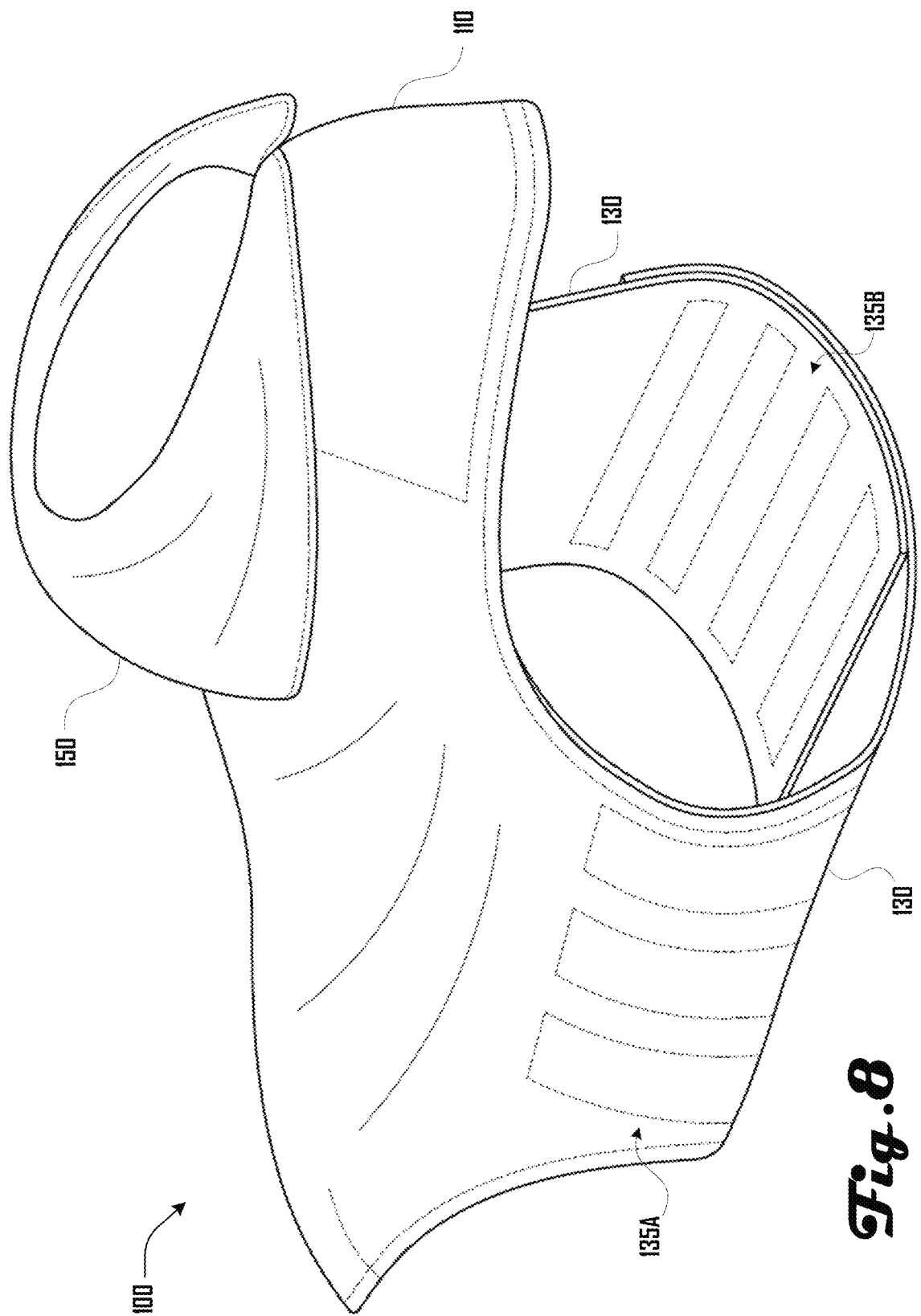

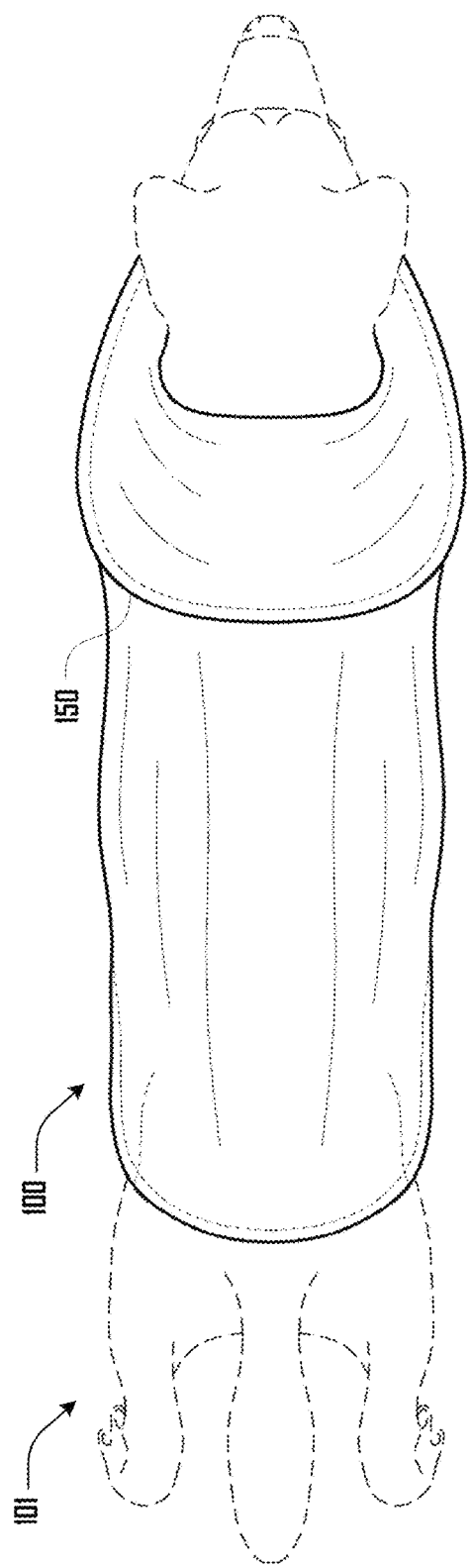
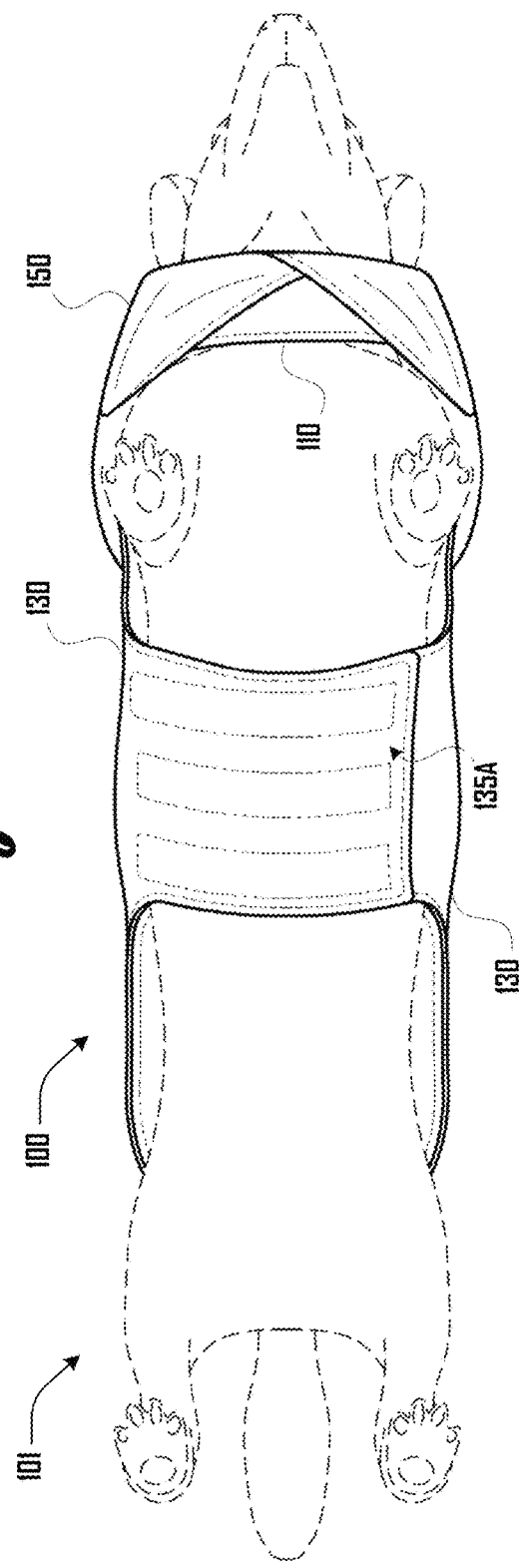
Fig. 11a
Fig. 11b

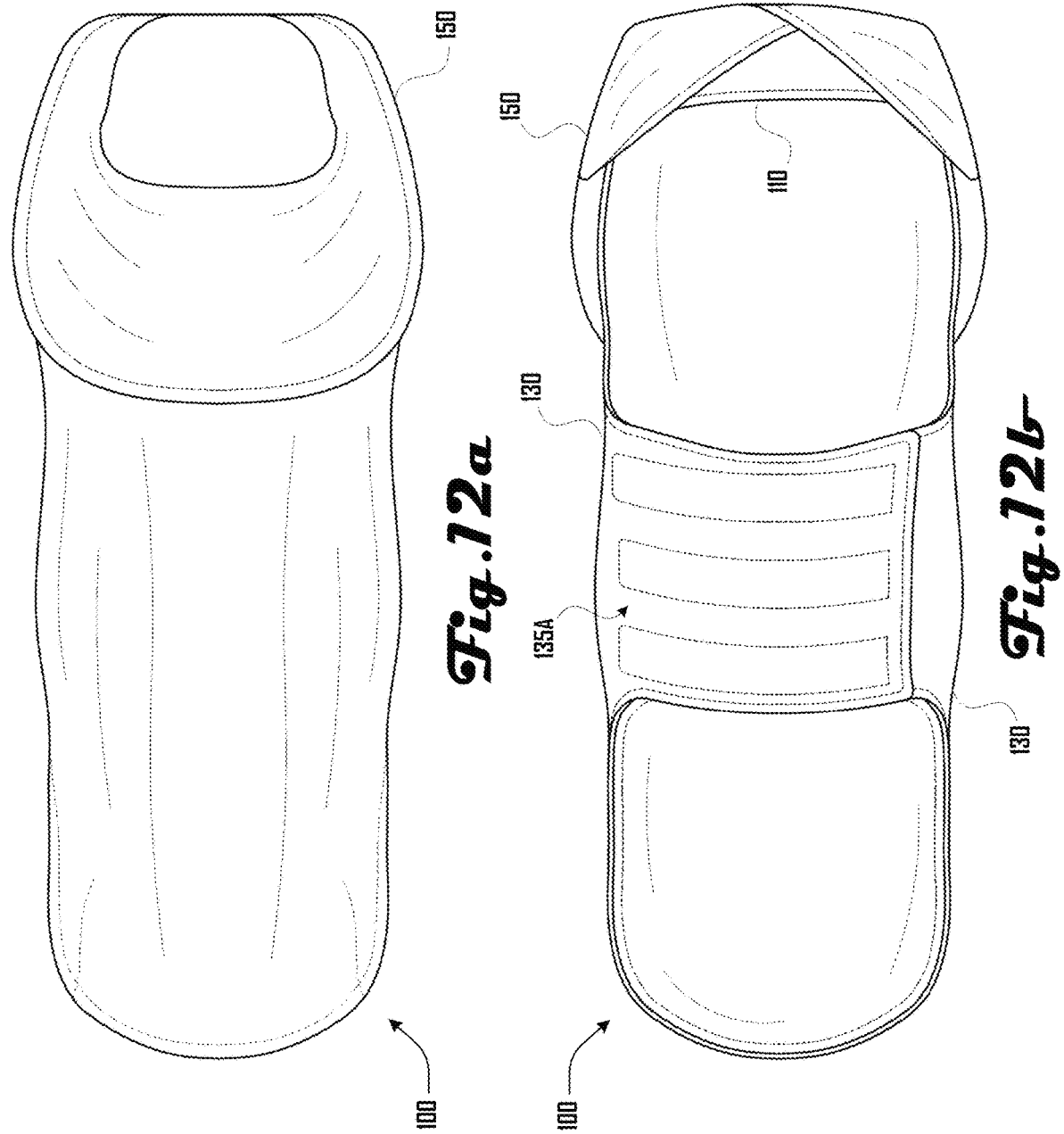

CALMING VEST

| SIZE | NUMERIC SIZE | DOG WEIGHT (LBS) | DOG WEIGHT (KG) | INSERT WEIGHT (LBS), 3% | INSERT WEIGHT (KG), 3% | CHEST (IN) | CHEST (CM) | NECK (IN) | NECK (CM) |
|---|---|---|---|---|---|---|---|---|---|
| XS | 8-10 | 6-10 | 2.7-4.5 | 0.15 | 0.07 | 11.5-15.5 | 29-39.5 | 8.5-10.5 | 22-27 |
| S | 10-12 | 8-17 | 3.6-7.7 | 0.24 | 0.11 | 16.5-21 | 42-53.5 | 12-14.5 | 30.5-37.5 |
| M | 14-16 | 15-32 | 6.8-14.5 | 0.45 | 0.2 | 19.5-25 | 49.5-63.5 | 15-18.5 | 38-47.5 |
| L | 18-20 | 27-45 | 12.2-20.4 | 0.75 | 0.34 | 21.5-28 | 54.5-71 | 16.5-20.5 | 42-52.5 |
| XL | 22-24 | 40-65 | 18-29.5 | 1.2 | 0.54 | 26.5-36 | 67.5-91.5 | 18-22.5 | 45.5-58 |
| XXL | 26-28 | 60+ | 27.2+ | 1.65 | 0.75 | 29.5-40.5 | 75-103 | 19.5-24.5 | 49.5-63 |

*Fig. 17a*

CP CALMING VEST

| SIZE | CP NUMERIC SIZE | DOG WEIGHT (LBS) | DOG WEIGHT (KG) | WEIGHT (LBS) | WEIGHT (KG) | CHEST (IN) | CHEST (CM) | NECK (IN) | NECK (CM) |
|---|---|---|---|---|---|---|---|---|---|
| XS | 8-10 | 5-8 | 2.3-3.6 | 0.15 | 0.07 | 11.5-15.5 | 29-39.5 | 8.5-10.5 | 22-27 |
| S | 10-12 | 8-15 | 3.6-6.8 | 0.24 | 0.11 | 16.5-21 | 42-53.5 | 12-14.5 | 30.5-37.5 |
| M | 14-16 | 15-25 | 6.9-11.3 | 0.45 | 0.20 | 19.5-24.5 | 49.5-62 | 15-18.5 | 38-47.5 |
| L | 18-20 | 25-40 | 11.3-18 | 0.75 | 0.34 | 22-27.5 | 56-70 | 16.5-20.5 | 42-52.5 |
| XL | 22-24 | 40-55 | 18-25 | 1.2 | 0.54 | 26.5-36 | 67.5-91.5 | 18-22.5 | 45.5-58 |
| XXL | 26-28 | 55-75 | 25-34 | 1.65 | 0.75 | 29.5-40.5 | 75-103 | 19.5-24.5 | 49.5-63 |

*Fig. 17b*

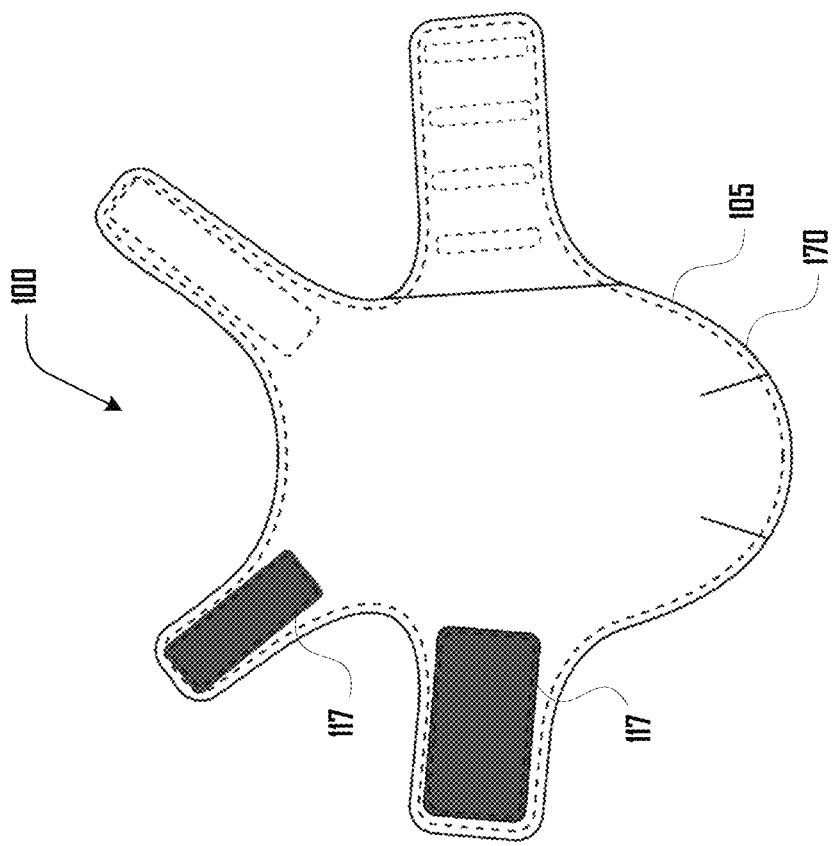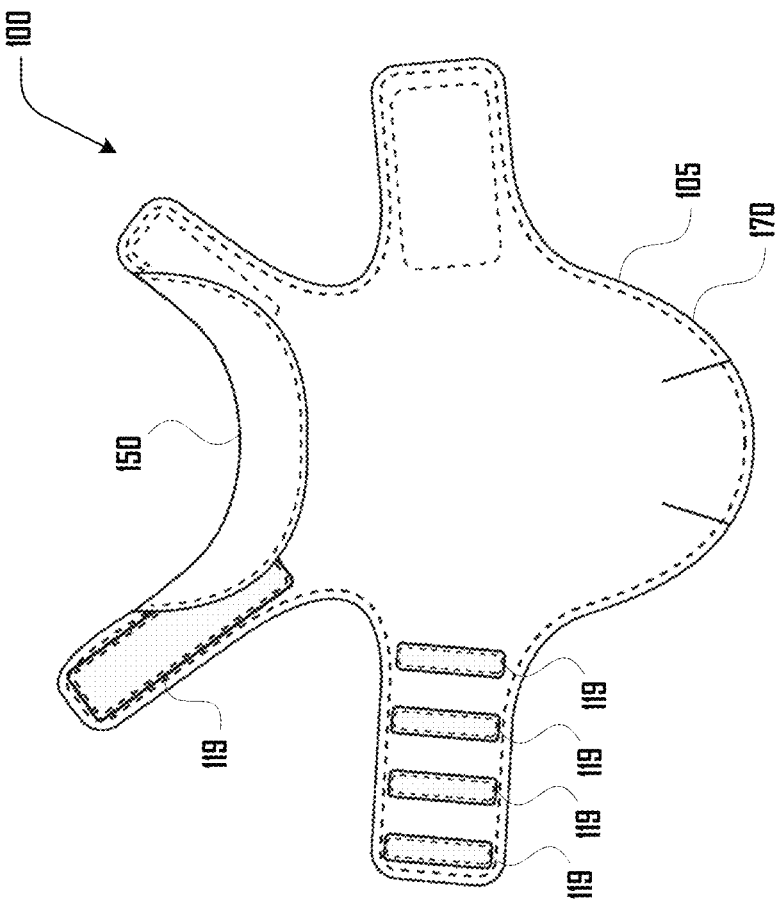

| SIZE TAILLE | DOG WEIGHT POIDS DU CHIEN | CHEST CIRCONFERENCE DU TORSE | INSERT WEIGHT POIDS DE L'INSERT |
|---|---|---|---|
| XS / TP | 6-10 lbs 2.7-4.5 kg | 11.5-15.5 in 29-39.5 cm | 0.15 lbs 0.07 kg |
| S / P | 9-17 lbs 4-7.7 kg | 16.5-21 in 42-53.5 cm | 0.24 lbs 0.11 kg |
| M / M | 16-31 lbs 7.3-14 kg | 19.5-25 in 49.5-63.5 cm | 0.45 lbs 0.20 kg |
| L / G | 26-45 lbs 11.8-20.4 kg | 21.5-28 in 54.5-71 cm | 0.75 lbs 0.34 kg |
| XL / TG | 42-65 lbs 19-29.5 kg | 26.5-36 in 67.5-91.5 cm | 1.2 lbs 0.54 kg |
| XXL / TTG | 60+ lbs 27.2+ kg | 29.5-40.5 in 75-103 cm | 1.65 lbs 0.75 kg |

*Fig. 22*

1. Please state dog's name and pet parent/observer's name.
2. Which trial number are you completing?
   - ☐ Base trial
   - ☐ First trial with product
   - ☐ Second trial with product
   - ☐ Third trial with product
3. Which product are you testing in this trial?
   - ☐ Weighted Calming Vest
   - ☐ Weighted Calming Blanket
   - ☐ Weighted Calming Toy
4. Where is this scenario taking place?
   - ☐ In the car
   - ☐ On a walk
   - ☐ When visitors come to the home
   - ☐ In a novel environment (puppy class, other people's home, vet clinic, etc.)
   - ☐ Other
5. Based on the scenario identified, what is the approximate amount of time your dog typically experiences anxiety? Keep this time frame as constant as possible going forward.
   - ☐ 10-30 minutes
   - ☐ 30-60 minutes
   - ☐ Over 60 minutes
6. Using the modified Fear, Anxiety & Stress Scale, what level is your dog during the anxiety-evoking scenario?
   - ☐ 0 – Relaxed: eyes/ears/mouth relaxed, tail normal position/wagging loose/ slowly back and forth, eats a treat.
   - ☐ 1 – Alert/Excited: looking around, pupils slightly dilated, ears perked forward, panting/relaxed lips, tail position/movement typical for the pet, eats a treat.

Fig. 23

☐ 2 – Mild signs of anxiety: interacts/looking around, dilated pupils, ears back or to the side, panting, tail down and/or tail wags quick/short side to side, pet fidgeting, extra attention seeking, may or may not eat a treat.

☐ 3 – Moderate signs of anxiety: hesitant to interact, turning head away, ears back, dilated pupils, darting eyes, panting heavily with lips tightly pulled back, tail tucked, tense/hunched or shaking, refuses treats or grabs them roughly.

☐ 4 – Severe signs of anxiety: won't interact, frozen still or trying to flee, hide or fight. Ears back, dilated pupils, darting eyes, panting heavily with lips tightly pulled back, tail tucked/tense or shaking, will not take treat.

7. Did your dog accept the treat during the scenario?
   ☐ Yes. Took it as they usually do
   ☐ Reluctant or roughly (not typical)
   ☐ No. Rejected the treat 8. Were there any variables that were out of your control that could have led to a skewed trial? ie. secondary passenger in the car, sudden and unexpected loud noise on walk, etc.
   ☐ No
   ☐ Yes. Please specify 9. In your opinion, did the calming product help to reduce the severity of the dog's anxiety? Please explain below.

*Fig. 24*

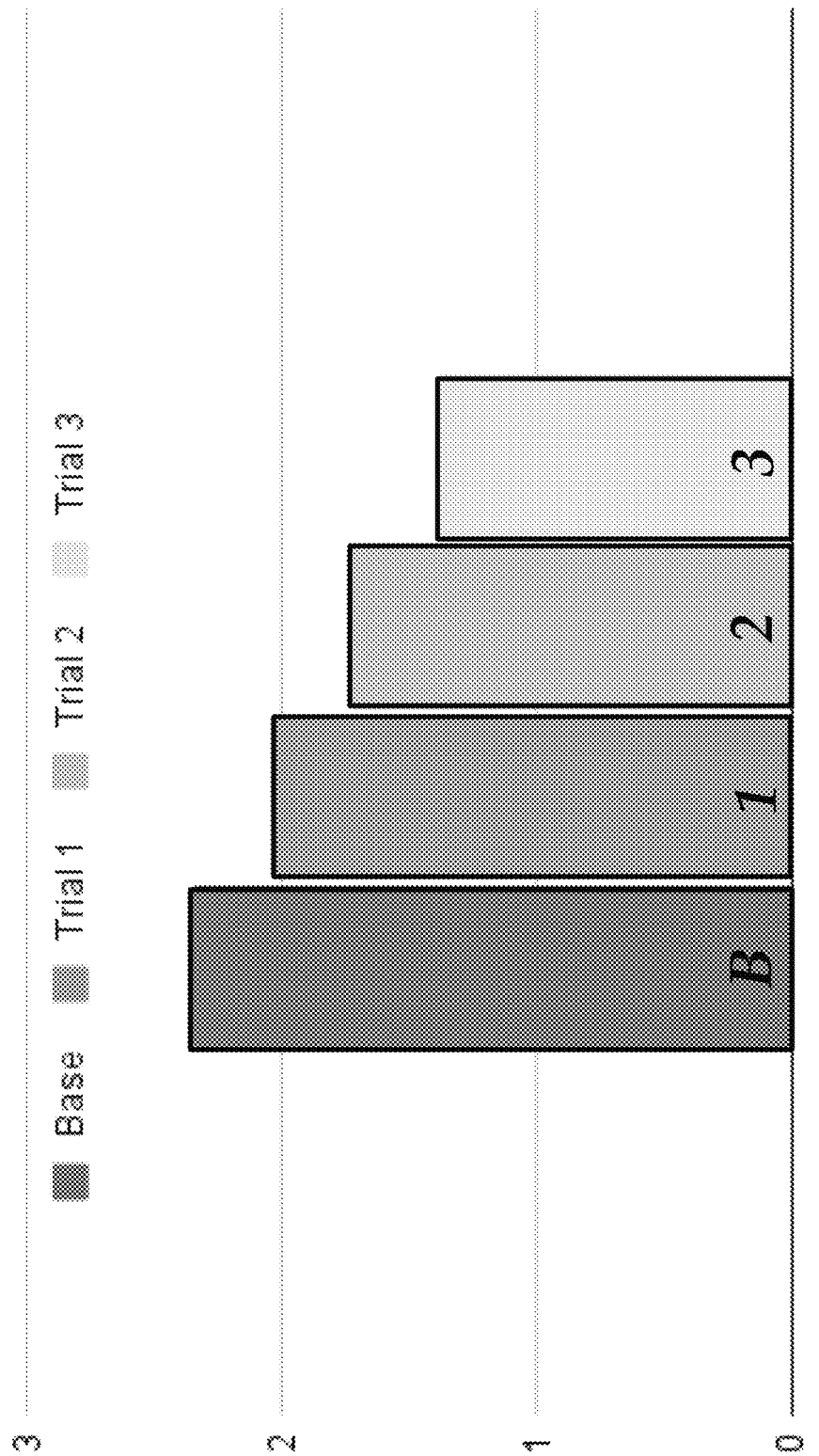

ANIMAL CALMING VEST SYSTEM AND METHOD

CROSS-REFERENCE TO RELATED APPLICATIONS

This application is a non-provisional of and claims the benefit of U.S. Provisional Application No. 63/422,346, filed Nov. 3, 2022, entitled "ANIMAL CALMING VEST SYSTEM AND METHOD". This application is hereby incorporated herein by reference in its entirety and for all purposes.

This application is also a continuation-in-part of U.S. Design Application No. 29/858,782, filed Nov. 3, 2022, entitled "ANIMAL CALMING VEST". This application is hereby incorporated herein by reference in its entirety and for all purposes.

BRIEF DESCRIPTION OF THE DRAWINGS

FIG. 7 illustrates a perspective view of an embodiment of an animal calming vest being worn by a dog.

FIG. 8 illustrates a perspective view of an embodiment of an animal calming vest with first and second pairs of coupling arms coupled together.

FIG. 11a illustrates a top view of an embodiment of an animal calming vest being worn by a dog.

FIG. 11b illustrates a bottom view of an embodiment of an animal calming vest being worn by a dog.

FIG. 12a illustrates a top view of an embodiment of an animal calming vest with first and second pairs of coupling arms coupled together.

FIG. 12b illustrates a bottom view of an embodiment of an animal calming vest with first and second pairs of coupling arms coupled together.

FIGS. 17a and 17b illustrate tables of example collar weights compared to weight, chest size and neck size.

FIG. 19a illustrates a first side of one embodiment of an animal calming vest.

FIG. 19b illustrates a second side of the embodiment of FIG. 19a.

FIG. 20b illustrates a second side of the embodiment of FIG. 20a.

FIG. 22 illustrates a sizing chart.

FIG. 23 illustrates a first page of a trial form.

FIG. 24 illustrates a second page of the trial form.

FIG. 25 is a chart of results of a weighted calming vest on the anxiety of a test group of dogs according to a modified FAS scale over four trials.

Figure 1:
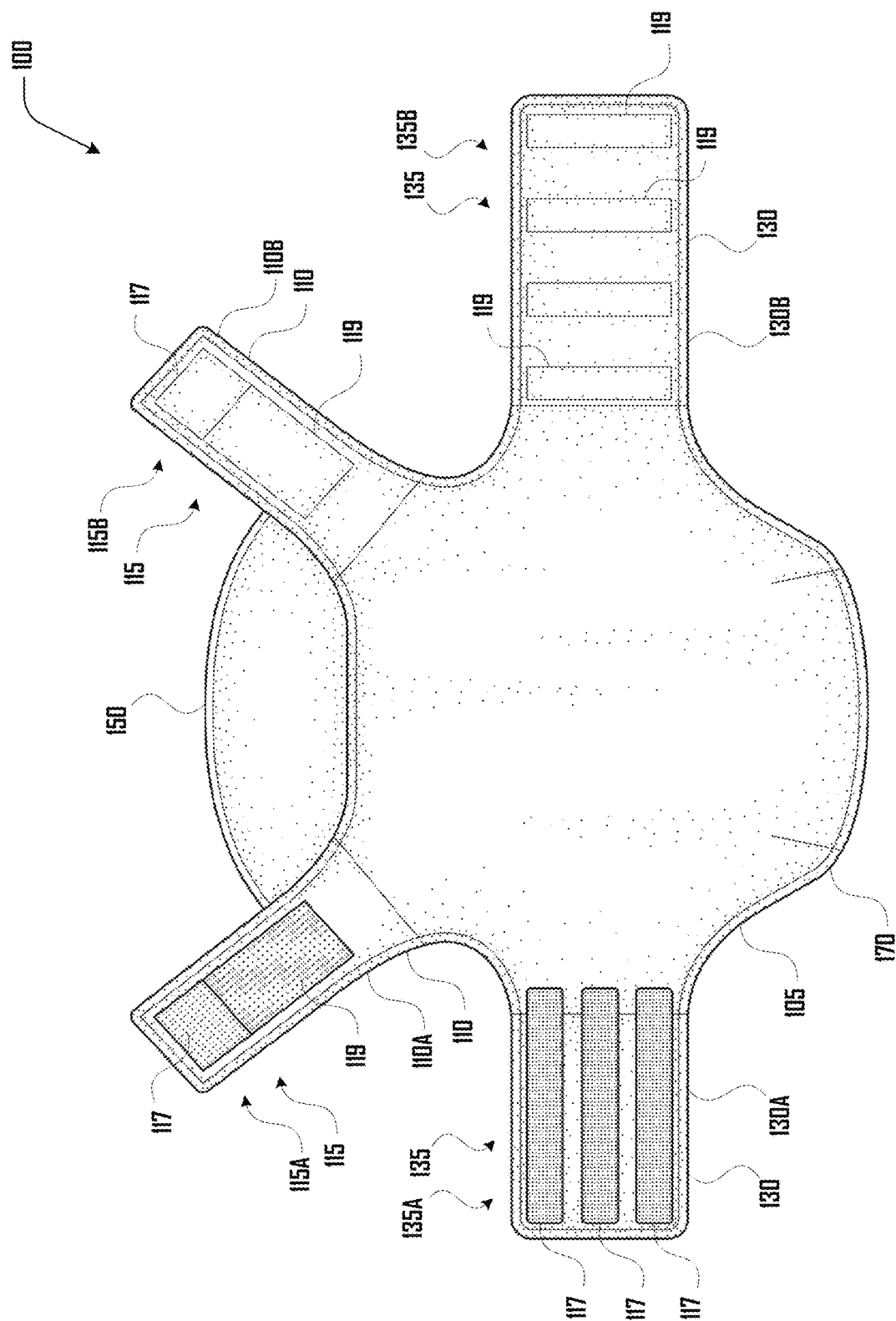
FIG. 1 is a side view of a first side of an animal calming vest of an embodiment.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Figure 2:
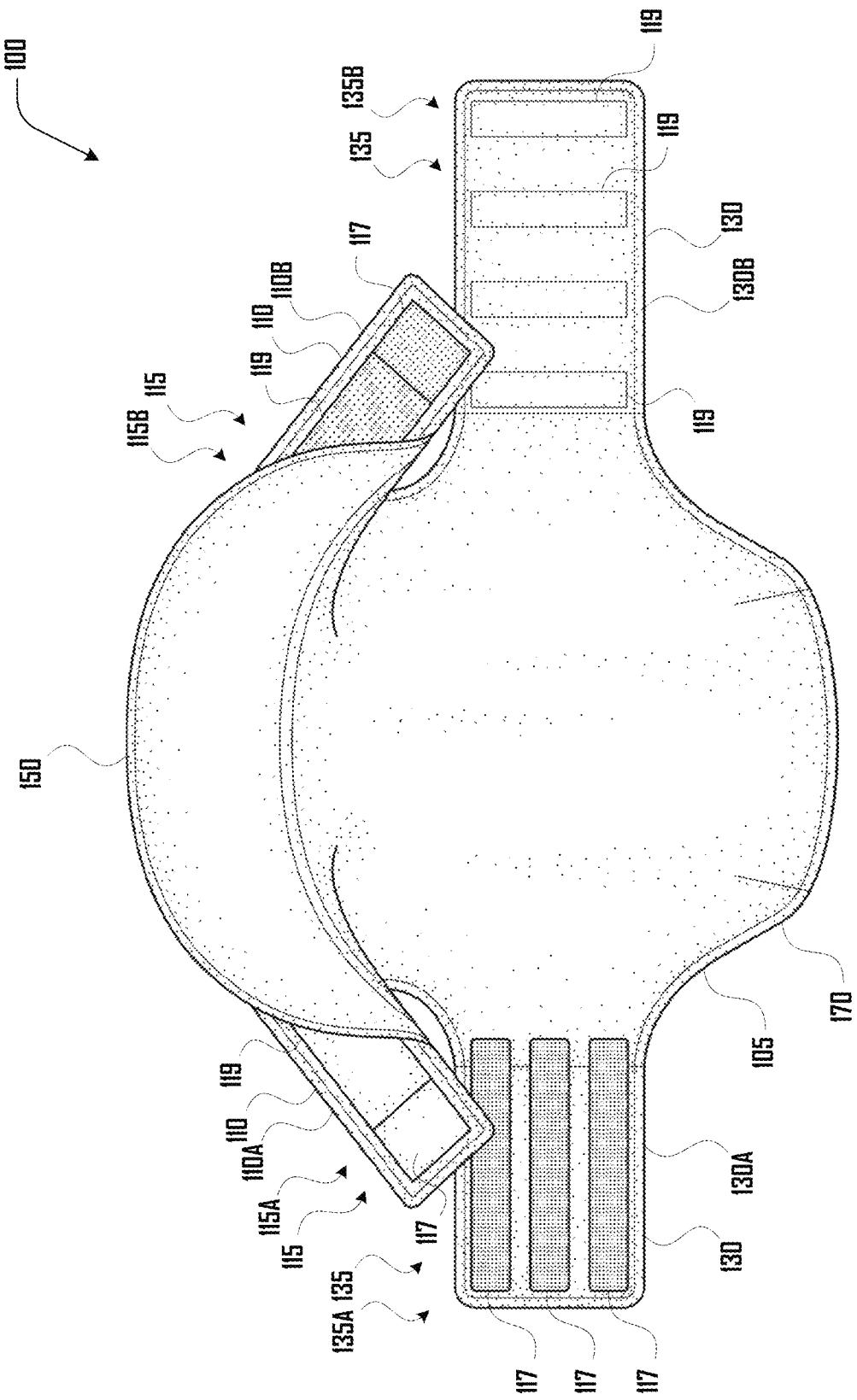
FIG. 2 is a side view of a second side of an animal calming vest of an embodiment.

Turning to FIGS. 1 and 2, an embodiment of an animal calming vest 100 is illustrated, that comprises a body 105 with a first pair of coupling arms 110A, 110B, a second pair of coupling arms 130A, 130B and a collar 150 that extend from a jacket 170. In various embodiments, the body 105 can comprise fabric having any suitable number of layers, which may include insulation, padding and the like.

In some embodiments, the animal calming vest 100 can consist of or consist essentially of a first pair of coupling arms 110A, 110B, a second pair of coupling arms 130A, 130B and a collar 150 that extend from a jacket 170. Additionally, in various embodiments, some or all of the first pair of coupling arms 110A, 110B, second pair of coupling arms 130A, 130B and/or collar 150 can be made of the same material as the jacket 170 and can extend contiguously from the jacket 170 with the same material as the jacket 170. In some embodiments, such contiguous extension can be completely contiguous via the same piece of contiguous material defining some or all of the first pair of coupling arms 110A, 110B, second pair of coupling arms 130A, 130B and/or collar 150 or can be contiguous via stitching, a seam, or the like, coupling the first pair of coupling arms 110A, 110B, second pair of coupling arms 130A, 130B and/or collar 150 to the jacket 170. In one embodiment, the first pair of coupling arms 110A, 110B and the first second coupling arm 130A are defined by a contiguous piece of materials without seams, or the like, and the second second coupling arm 130B and collar 150 are defined by the same materials as the jacket 170 and contiguously coupled to the jacket 170 via seams.

For example, such embodiments can be in contrast to embodiments where the first pair of coupling arms 110A, 110B and/or second pair of coupling arms 130A, 130B are defined by straps, webbing, ropes, lines, ribbons, or the like that are made of a different material than the jacket 170. In various embodiments, contiguous couplings can be desirable and are not simply an obvious design choice or optimization and can be specifically configured to maximize surface area of the first pair of coupling arms 110A, 110B and/or second pair of coupling arms 130A, 130B, for the purpose of desirably increasing the calming effect of the animal calming vest 100. Additionally, in various embodiments, a contiguous coupling of the first pair of coupling arms 110A, 110B, second pair of coupling arms 130A, 130B and/or collar 150 to the jacket 170 can increase the calming effect of the animal calming vest 100 by creating a contiguous fit of the animal calming vest 100 about the animal wearing the animal calming vest 100.

In some embodiments, it can be desirable to maximize the width of the first and second coupling arms 110, 130 to maximize the calming effect of the animal calming vest 100, to improve the fit of the animal calming vest 100, and the like. For example, in one embodiment, the first coupling arms 110 can have a minimum width of greater than or equal to 8 cm and the second coupling arms 130 can have a minimum width of greater than or equal to 11 cm.

In some embodiments, the first coupling arms 110 can have a minimum width of greater than or equal to 4 cm, 5 cm, 6 cm, 7 cm, 8 cm, 9 cm, 10 cm, 11 cm, 12 cm, 13 cm, 14 cm, 15 cm, and the like. In some embodiments, the second coupling arms 130 can have a minimum width of greater than or equal to 4 cm, 5 cm, 6 cm, 7 cm, 8 cm, 9 cm, 10 cm, 11 cm, 12 cm, 13 cm, 14 cm, 15 cm, 16 cm, 17 cm, 18 cm, 19 cm, 20 cm, and the like.

Also, in some embodiments, opposing faces of the animal calming vest 100 (see e.g., opposing faces shown in FIGS. 1 and 2) can have different configurations of contiguous couplings of the first pair of coupling arms 110A, 110B, second pair of coupling arms 130A, 130B and/or collar 150 to the jacket 170. For example, on one face of the animal calming vest 100 (e.g., top face, internal face, first face, second face, or the like) the first pair of coupling arms 110A, 110B can be coupled continuously via a contiguous piece of materials without seams, or the like, and on the opposite face, the first pair of coupling arms 110A, 110B can be coupled continuously via seams, or the like.

The first coupling arms 110 can comprise respective first-arm couplers 115, which can allow the first coupling arms 110 to be releasably coupled about the neck/chest of an animal 101 (e.g., a dog) as shown in the examples of FIGS. 7, 8, 9a, 10a, 11a, 11b, 12a, 12b and 13-16. For example, the first-arm couplers 115 can comprise hook tape 117 and loop tape 119 that allow the first coupling arms 110 to be releasably coupled to accommodate various animal body sizes, desired snugness, and the like. As shown in the example of FIGS. 1 and 2, the first-arm couplers 115 can comprise a portion of hook tape 117 at a distal end of the arm couplers 115, with a portion of loop tape 119 extending along a portion of the first-arm couplers 115 adjacent to the hook tape 117 and closer to the jacket 170 from which the first-arm couplers 115 extend. As shown in the example of FIGS. 1 and 2, a first first-arm coupler 115A of the first first coupling arm 110A can be on an opposite side compared to a second first-arm coupler 115B of the second first coupling arm 110B. This example should not be construed as being limiting and in further embodiments, various suitable coupling elements can be used in place of or in addition to one or both of the first-arm couplers 115 (e.g., ties, clips, latch, buckle, and the like). Additionally, other suitable configurations of hook and loop tape 117, 119 can be used. For example, while various embodiments include both of the first-arm couplers 115 having both hook and loop tape 117, 119, in some embodiments, the first-arm couplers 115 may have one of hook and loop tape 117 or one of the first arm couplers 115 can have both hook and loop tape 117 with the other only having one of hook and loop tape 117.

The second coupling arms 130 can comprise respective second-arm couplers 135, which can allow the second coupling arms 130 to be releasably coupled about the torso of an animal 101 (e.g., a dog) as shown in the examples of FIGS. 7, 8, 9a, 9b, 10a, 10b, 11b, 12b and 13-16. For example, the second-arm couplers 135 can comprise hook tape 117 and loop tape 119 that allow the second coupling arms 130 to be releasably coupled to accommodate various animal body sizes, desired snugness, and the like. As shown in the example of FIGS. 1 and 2, a first second-arm coupler 135A can comprise a plurality of lengths of hook tape 117 (e.g., three) extending in parallel along the length of the first second coupling arm 135A. A second second-arm coupler 135B can comprise a plurality of lengths of loop tape 119 (e.g., four) extending in parallel along the width of the second second coupling arm 130B.

It should be noted that FIGS. 1 and 2 illustrate one side of the generally planar body of the animal calming vest 100, and that the loop tape 119 of the second second-arm coupler 135B of the second second coupling arm 130B illustrated and labeled in FIGS. 1 and 2 is disposed on an opposing face of the animal calming vest 100 and on an opposing face of the second second-arm coupler 135B compared to the of lengths of hook tape 117 on the first second-arm coupler 135A. For example, FIGS. 1 and 2 illustrate a similar configuration of the first-arm couplers 115 on respective first coupling arms 110.

The respective second-arm couplers 135 can be disposed in perpendicular directions relative to each other on the respective coupling arms 130. As shown in the example of FIGS. 1 and 2, a first second-arm coupler 135A of the first second coupling arm 130A can be on an opposite side compared to a second second-arm coupler 135B of the second second coupling arm 130B. This example should not be construed as being limiting and in further embodiments, various suitable coupling elements can be used in place of or in addition to one or both of the second-arm couplers 135 (e.g., ties, clips, snap, latch, buckle, and the like). Also, while the example of FIGS. 1 and 2 illustrates respective second-arm couplers 135 comprising a plurality of respective strips of hook and loop tape 117, 119, in further embodiments, one or both of the second-arm couplers 135 can consist of or consist essentially of only a single strip or piece of hook and/or loop tape 117, 119.

However, in some embodiments, one or both of the first and second coupling arms 110, 130 can consist of or consist essentially of only a single type of coupler such as only hook-and-loop couplers. Accordingly, in some embodiments, couplers or coupling elements, such as a tie, clip, snap, latch, buckle, and the like, can be absent from one or both of the first and second coupling arms 110, 130.

Additionally, in various embodiments, such coupling elements can be present on other locations of an animal calming vest 100 for various suitable purposes. Some embodiments can include a small snap on the bottom of the collar 150 to keep the collar 150 in place. For example, when being worn by a dog, such a snap can be positioned over the spine of the dog and coupling the collar 150 to the jacket 170 so that the collar 150 does not flip up or otherwise undesirably move out of position.

Additionally, other suitable configurations of hook and loop tape 117, 119 can be used. For example, lengths and/or widths of hook and loop tape 117, 119 can be larger or smaller than the examples illustrated or discussed herein. In one embodiment, portions of loop tape 119 on one or both of the first-arm couplers 115 can be longer than as shown in FIGS. 1 and 2, such as extending to a seam or end of one or both of the first-arm couplers 115, instead of terminating along the length of the first-arm couplers 115. FIGS. 19a, 19b, 20a and 20b illustrate examples of further embodiments.

Additionally, in various embodiments, the animal calming vest 100 can have a central plane of symmetry about a central axis of the animal calming vest 100, with the animal calming vest 100 being symmetrical on opposing sides of this plane of symmetry or central axis aside from elements such first and second arm couplers 115, 135, and the like. However, in some embodiments, a central plane of symmetry can be absent.

Figure 3:
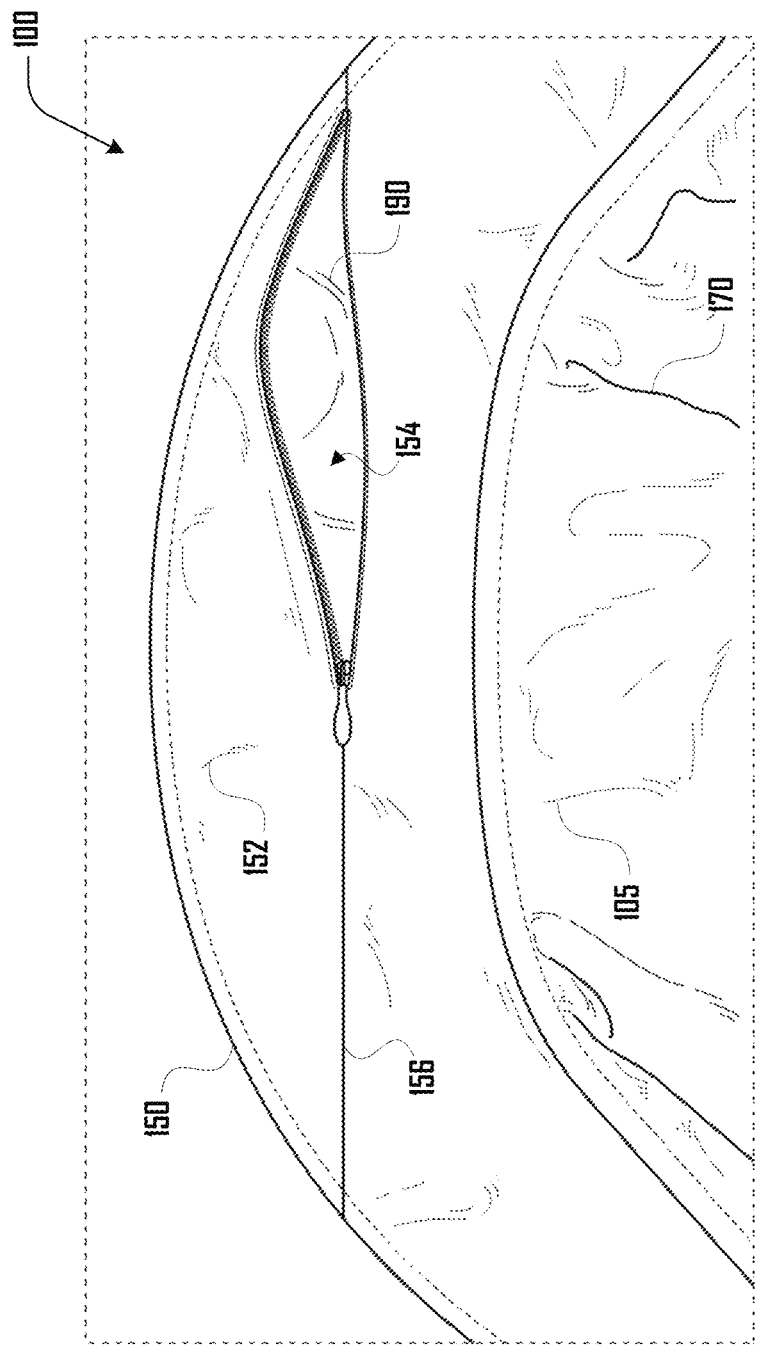
FIG. 3 illustrates an example of a configuration of a collar of an animal calming vest with a collar zipper on one side of the collar partially unzipped to generate an opening into an internal collar cavity and exposing a portion of a collar weight.

As shown in FIGS. 3-6, the collar 150 can comprise a collar body 152 that defines an internal collar cavity 154, which can be accessed via a collar zipper 156 that extends along one side of the collar 150 in the collar body 152. A collar weight 190 can be removably disposed within the collar cavity 154 of the collar 150. For example, FIG. 3 illustrates an example of a configuration of a collar 150 of an animal calming vest 100 with the collar zipper 156 on one side of the collar 150 partially unzipped to generate an opening into the internal collar cavity 154 and exposing a portion of the collar weight 190.

Figure 4:
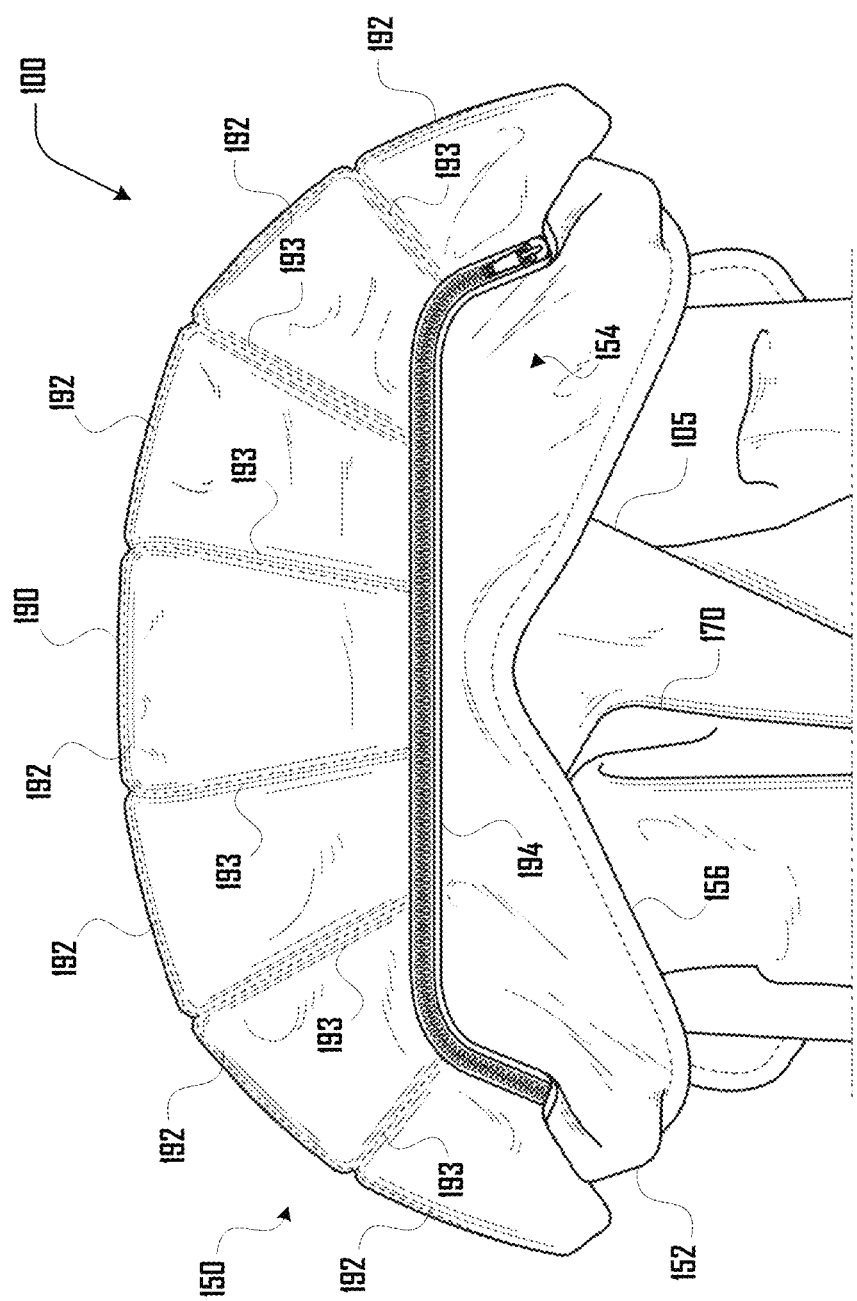
FIG. 4 illustrates another example configuration of a collar of an animal calming vest with the collar zipper substantially or fully unzipped and the collar body folded back inside-out to expose the collar weight.
Figure 5:
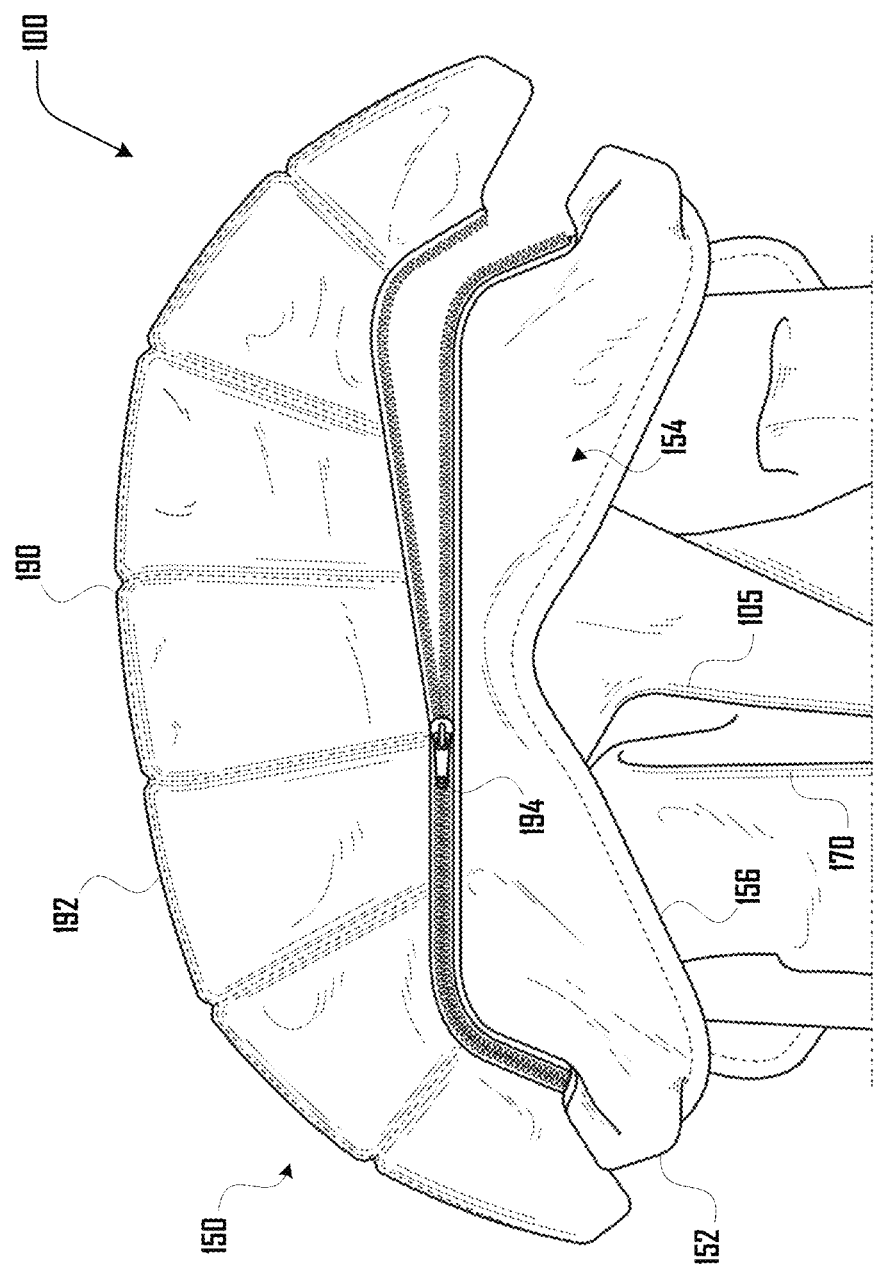
FIG. 5 illustrates that a collar weight zipper can be zipped/unzipped such that the collar weight can be attached/detached from the collar body.
Figure 6:
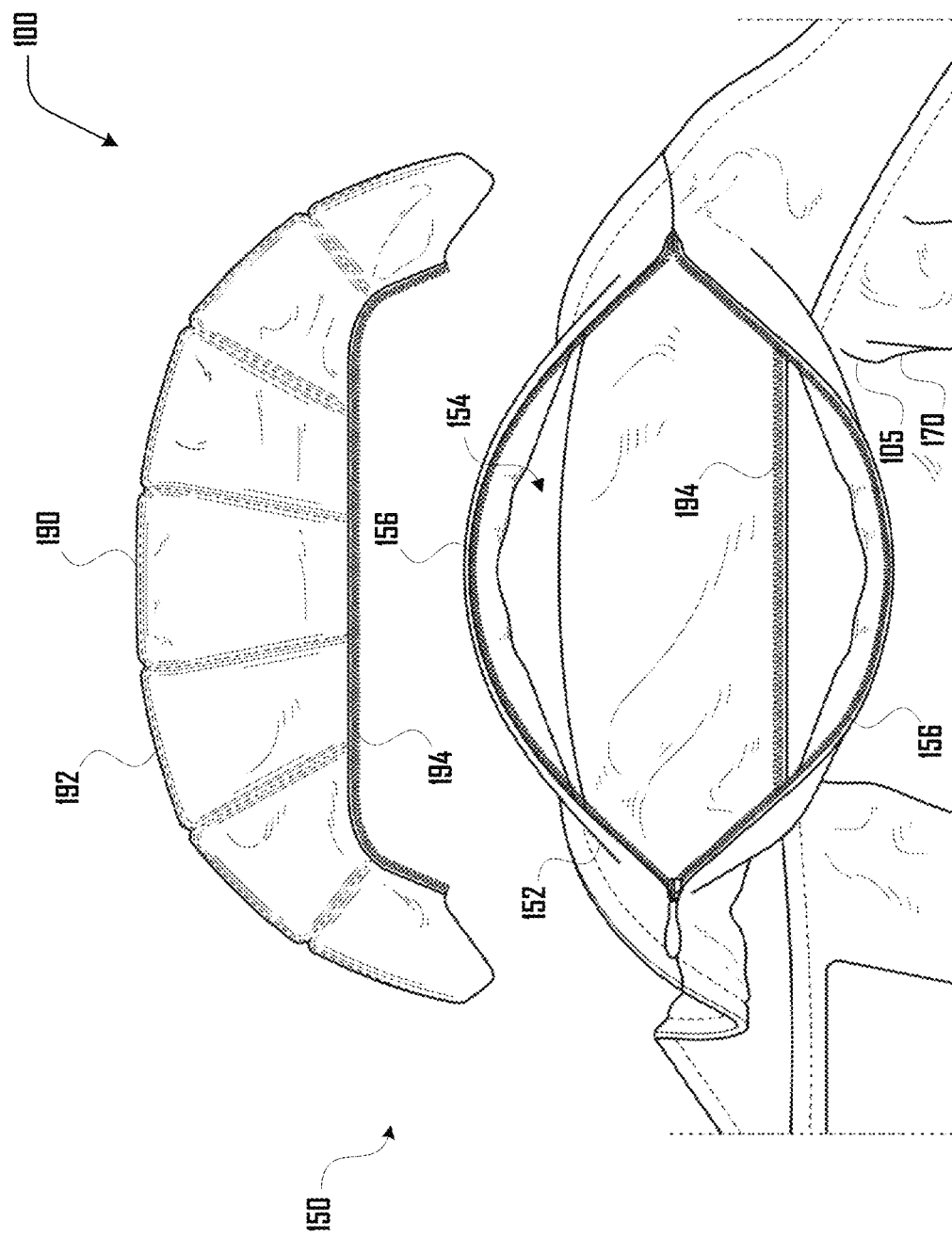
FIG. 6 illustrates the collar weight detached from the collar body.
Figure 9B:
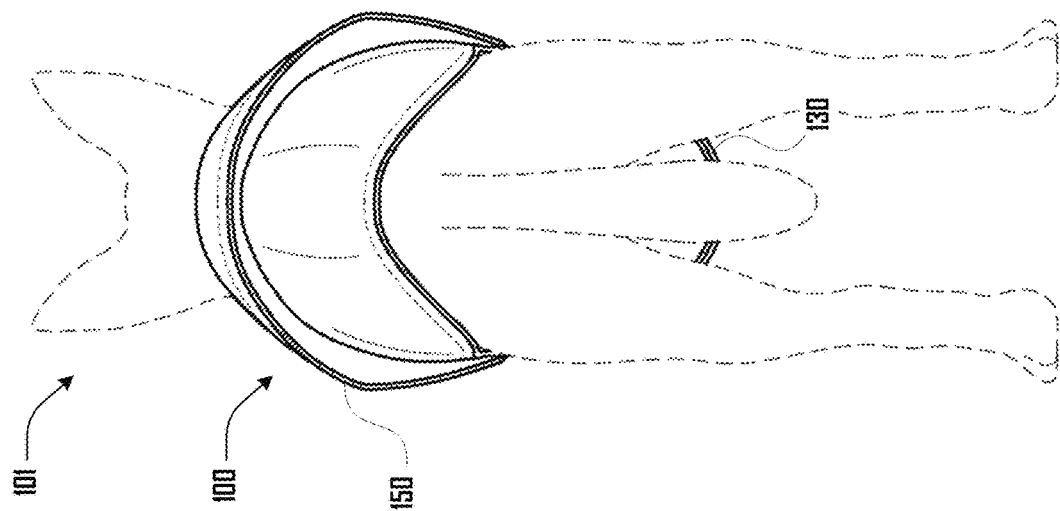
FIG. 9b illustrates a rear view of an embodiment of an animal calming vest being worn by a dog.
Figure 9A:
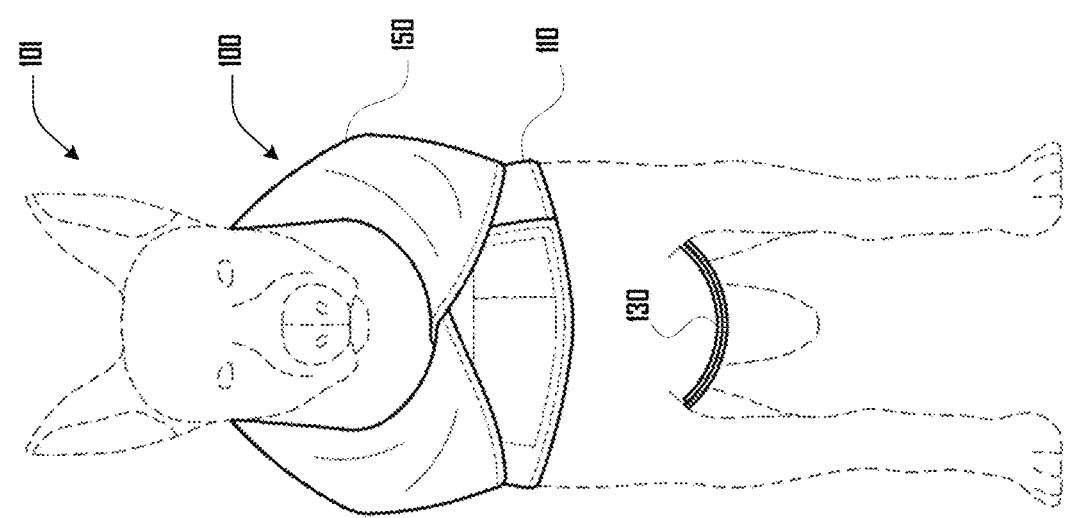
FIG. 9a illustrates a front view of an embodiment of an animal calming vest being worn by a dog.
Figure 10B:
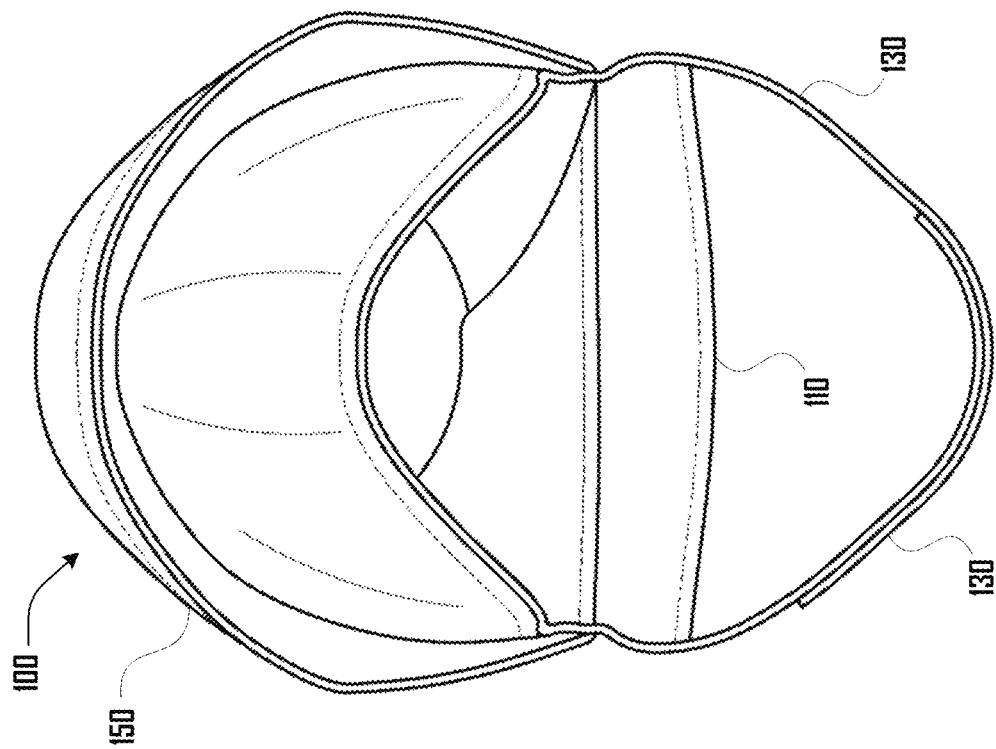
FIG. 10b illustrates a rear view of an embodiment of an animal calming vest with first and second pairs of coupling arms coupled together.
Figure 10A:
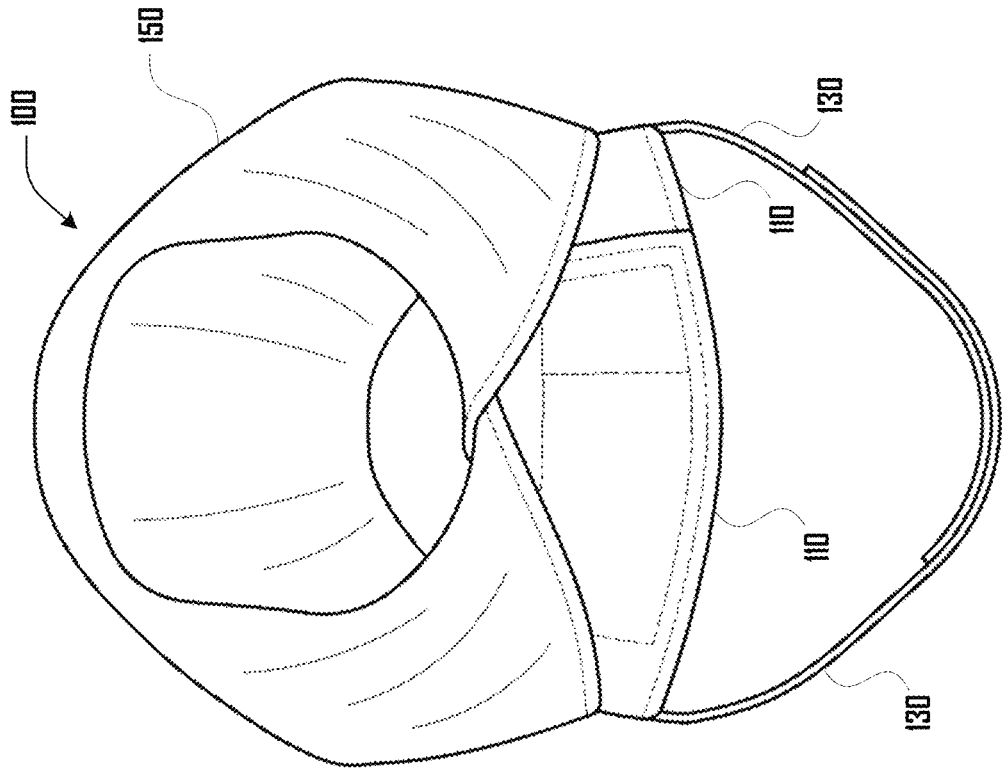
FIG. 10a illustrates a front view of an embodiment of an animal calming vest with first and second pairs of coupling arms coupled together.
Figure 13:
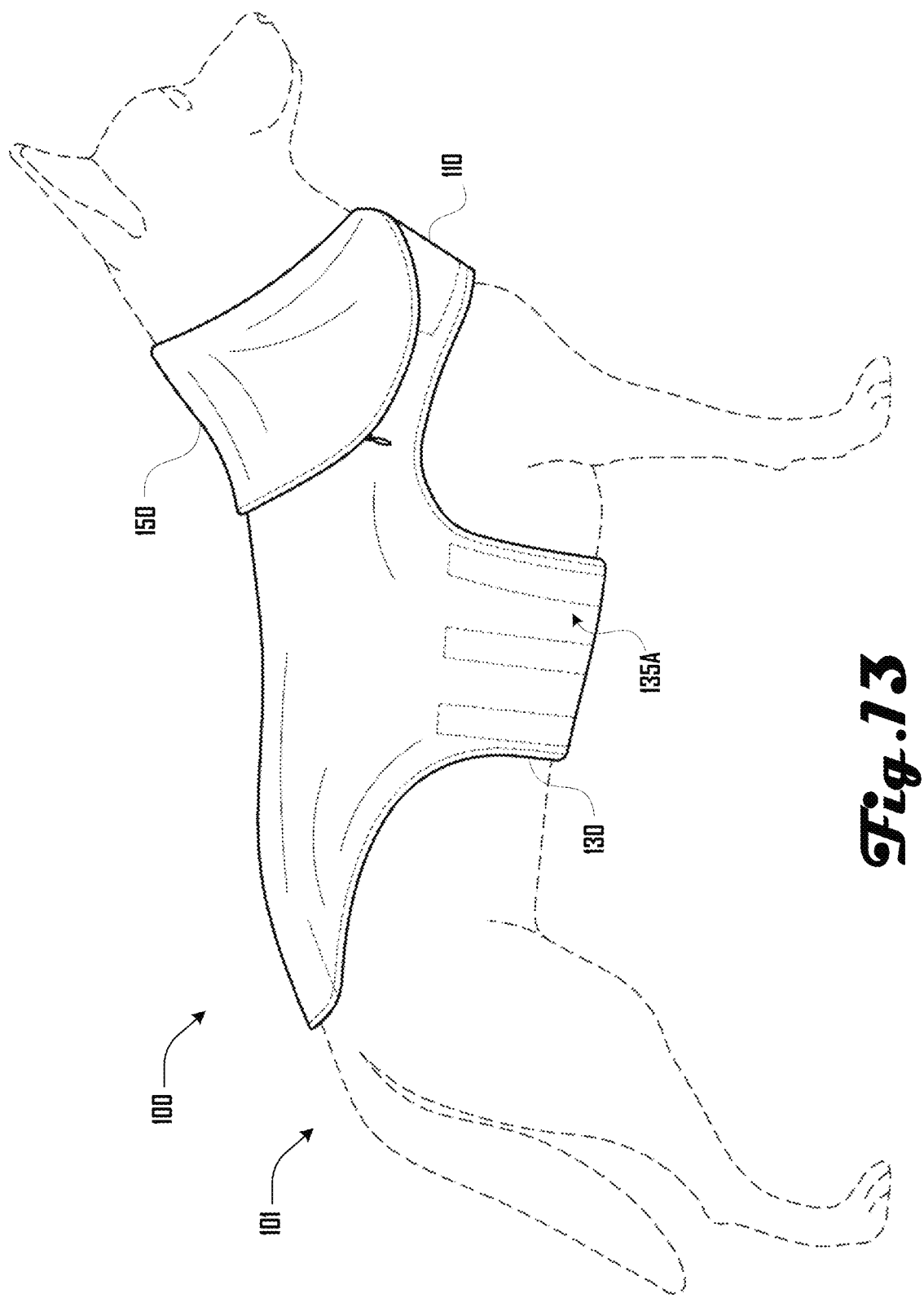
FIG. 13 illustrates a right-side view of an embodiment of an animal calming vest being worn by a dog.
Figure 14:
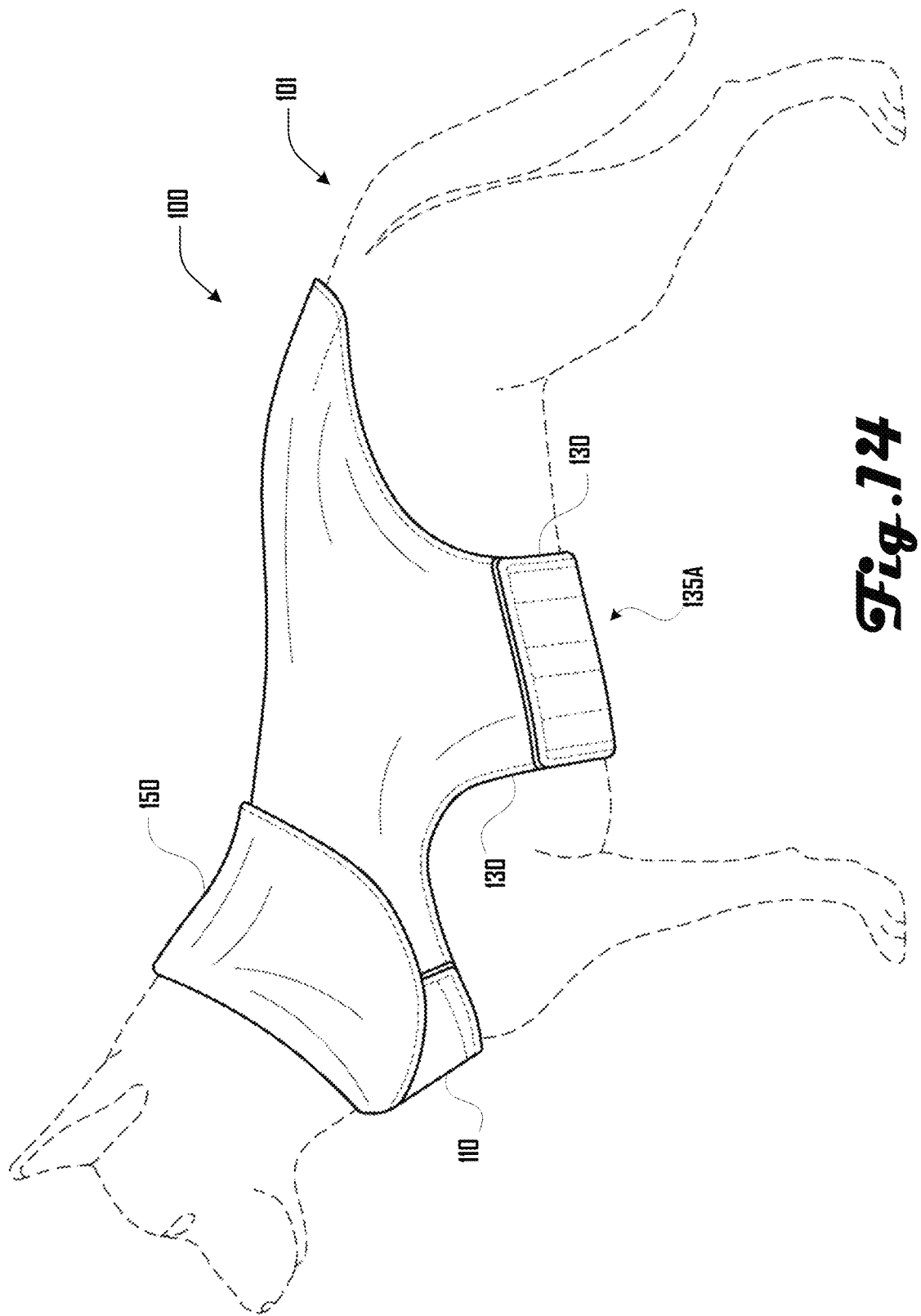
FIG. 14 illustrates a left ide view of an embodiment of an animal calming vest being worn by a dog.
Figure 15:
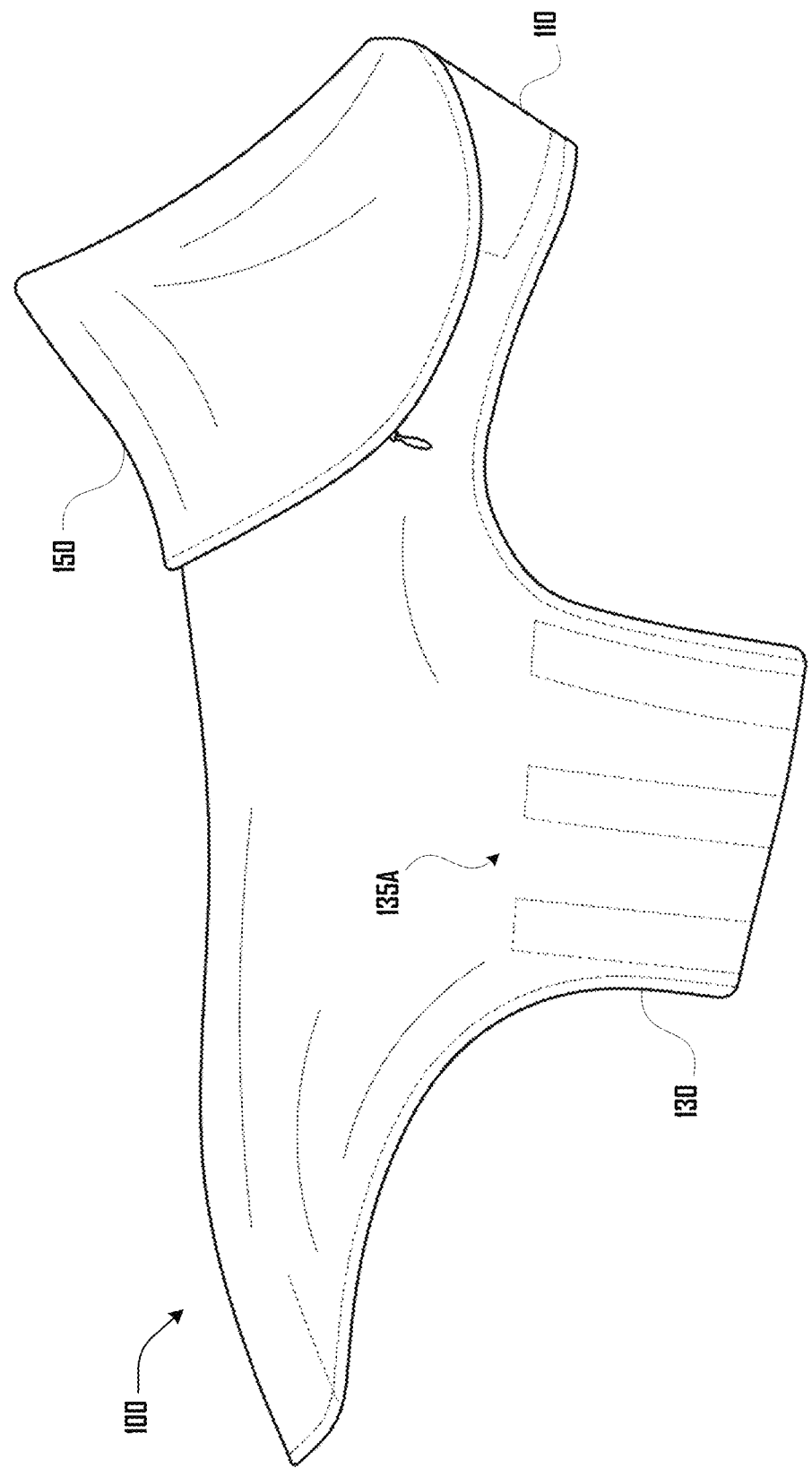
FIG. 15 illustrates a right-side view of an embodiment of an animal calming vest with first and second pairs of coupling arms coupled together.
Figure 16:
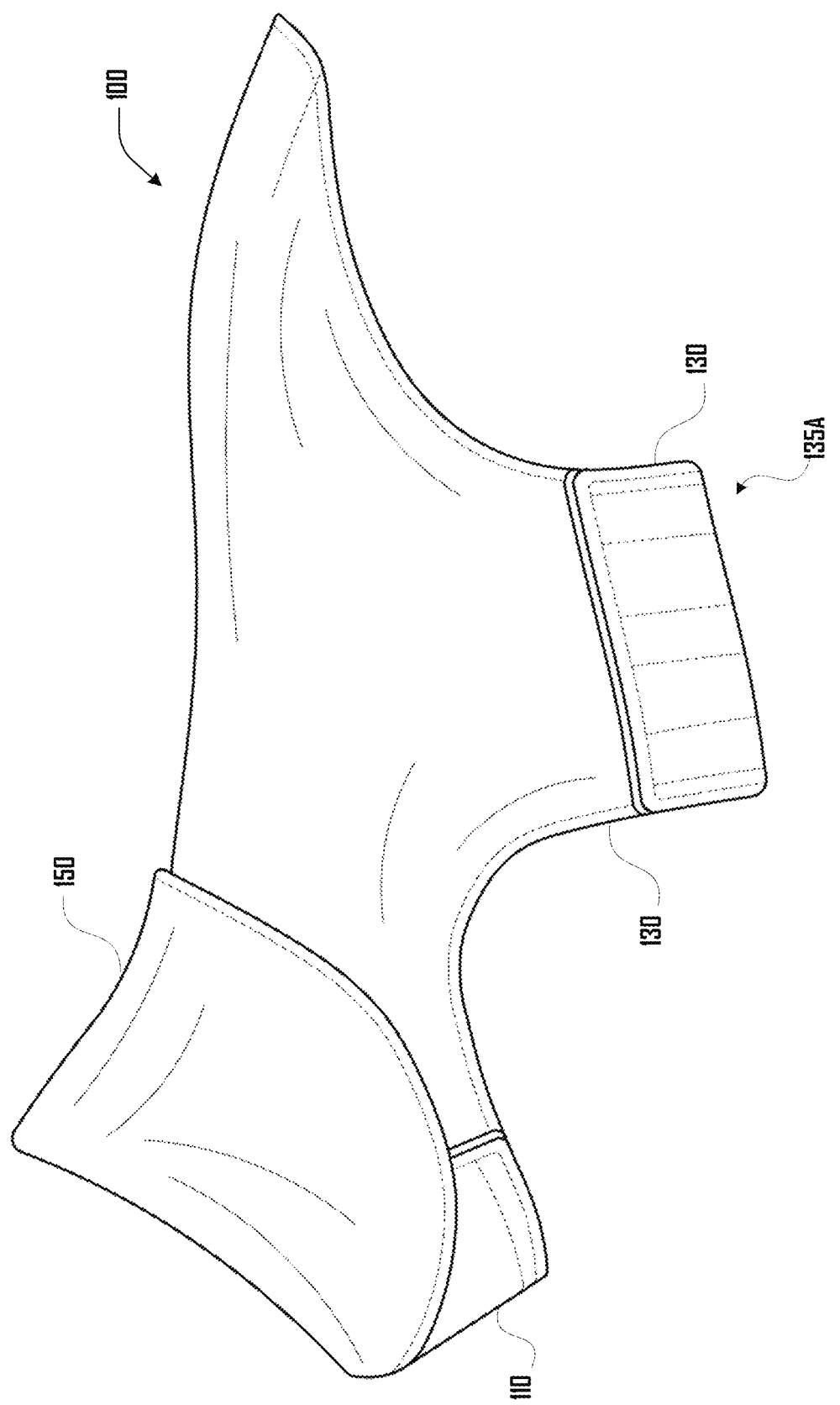
FIG. 16 illustrates a left side view of an embodiment of an animal calming vest with first and second pairs of coupling arms coupled together.

FIG. 4 illustrates another example configuration of a collar 150 of an animal calming vest 100 with the collar zipper 156 substantially or fully unzipped and the collar body 152 folded back inside-out to expose the collar weight 190. As shown in the example of FIG. 4, the collar weight can comprise a plurality of weight units 192, which can be separate cavities within the collar 150, defined at least in part by seams 193, in which one or more weights or weight material can be disposed. For example, in some embodiments, sand, metal pieces, or the like, can be disposed in the weight units 192 to generate a weight of the collar weight 190. As also shown in FIG. 4, the collar weight 190 can be coupled to the body 105 of the animal calming vest 100 within the collar body 152 via a collar weight zipper 194. As shown in FIGS. 5 and 6, the collar weight zipper 194 can be unzipped such that the collar weight 190 can be detached from the collar body 152.

As shown in the example of FIGS. 4, 5 and 6, the collar weight 190 can be generally crescent shaped with seams 193 defining at least a portion of the weight units 192 extending radially from the edge of the collar weight 190 (e.g., the edge having the collar weight zipper 194) and with the collar weight 190 having a central plane of symmetry. In some embodiments, the collar weight 190 can be generally crescent shaped with a maximum width at the central plane of symmetry, which can be greater or equal to 5 cm, 6 cm, 7 cm, 8 cm, 9 cm, 10 cm, 11 cm, 12 cm, 13 cm, 14 cm, 15 cm, 16 cm, 17 cm, 18 cm, 19 cm, 20 cm, or the like. In various embodiments, the collar weight 190 can be generally planar and crescent shaped with a convex edge and a concave edge, with the collar weight zipper 194 disposed along the concave edge.

Having radial weight units 192 as shown in FIGS. 4, 5 and 6 can be desirable to limit movement of weights or weight material within the collar weight 190 such that the weights or weight material within the collar weight 190 remains more evenly distributed within the collar weight 190 compared to a configuration, for example, where the collar weight 190 has a single cavity for weights or weight material or lateral shaped weight units 192.

For example, as shown in FIGS. 7, 8, 9a, 9b, 10a, 10b, 11a, 11b, 12a, 12b and 13-16, the collar 150 and collar weight 190 can be configured to surround the posterior neck area of an animal 101 (e.g., a dog) with the plane of symmetry of the collar weight 190 generally disposed coincident with the spine of the animal 101 and laying over opposing sides of the spine about the posterior neck and back of the animal 101. Given such a configuration when the animal calming vest 100 is worn by the animal 101, the radial weight units 192 can provide for more even weight distribution about the spine, neck and back of the animal 101 compared to other configurations.

In various embodiments, the weight of the collar 150 and collar weight 190 can provide a calming effect for the animal 101 based on the specific presence of the weight of the collar 150 and collar weight 190 about the spine, neck and back of the animal 101. For example, pressure applied to the neck area can stimulate the vagal nerve. Vagal nerve output connects to many organs in the body, including the heart muscle. Specific stimulation to the vagal neck area can reduce heart rate, therefore promoting a reduction in anxious emotions as discussed in more detail herein. There also exists a connection between emotional regulation and the body's skin. This transfer of information is complete via specific nerves called "C-tactile afferents". C-tactile afferents represent the pathway to the limbic system from the skin, via a small part of the brain known as the insular cortex. These findings support the positive emotional effect that a neck collar weight 190 of a suitable weight can have on animals as discussed in more detail herein.

In various embodiments, the weight of the collar 150 and collar weight 190 can provide a calming effect for the animal 101 based on the specific presence of the weight of the collar 150 and collar weight 190 about the spine, neck and back of the animal 101 with greater weight medially at the base of the neck at the spine with decreasing weight toward the periphery based on the crescent shape of the collar weight 190 and with generally the same amount of weights or weight material per unit volume within the respective weight units 192 on opposing sides of spine of the animal 101 or a plane of symmetry of the collar weight 190. Accordingly, in various embodiments, only the collar 150 is weighted, with other portions of the animal calming vest 100 not being weighted. For example, other portions of the animal calming vest 100 aside from the collar 150 and collar weight 190 can be without weight or weight material. For example, such other portions of the animal calming vest 100 aside from the collar 150 and collar weight 190 can only comprise elements such as fabric, insulation and the like as opposed to weights or weight material as discussed herein.

In various embodiments, the weight of the collar weight 190 can be based on one or more of: the size or weight of the animal 101 that is to be wearing the animal calming vest 100, chest size of the animal 101 that is to be wearing the animal calming vest 100, neck size of the animal 101 that is to be wearing the animal calming vest 100, and the like. Examples of collar weights compared to weight, chest size and neck size are illustrated in the tables of FIGS. 17a and 17b. Examples of collar weights compared to animal weight are illustrated in the table below. Some embodiments can include collar weight within +/−0.1, 0.2, 0.3, 0.4, 0.5 pounds of the example values below and in FIGS. 17a and 17b.

TABLE 1

| ALPHA | NUMERIC | COLLAR WEIGHT (lbs) | ANIMAL WEIGHT (lbs) | WEIGHT PERCENT |
|---|---|---|---|---|
| S | 10 to 12 | 0.24 | 5 to 12 | 4.8%-2.0%, |
| M | 14 to 16 | 0.51 | 13 to 24 | 3.9%-2.1% |
| L | 18 to 20 | 0.99 | 25 to 39 | 4.0%-2.5% |
| XL | 22 to 24 | 1.35 | 40 to 54 | 3.4%-2.5% |
| XXL | 26 to 28 | 1.65 | 55 to 75 | 3.0%-2.2% |

In various embodiments, an optimal amount of weight for the collar 150 and/or collar weight 190 to generate a calming effect in the animal 101 can be within a range of the body weight of the animal 101, which can include a weight percentage of 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, or the like, or a range between such example values. In various embodiments, weight percentage values below a given threshold will not generate a calming effect in the animal 101 because there is insufficient weight relative to the body weight of the animal 101. Additionally, in various embodiments, weight percentage values above a given threshold will not generate a calming effect in the animal 101 because the weight relative to the body weight of the animal 101 causes discomfort or pain to the animal instead of generating a calming effect. Accordingly, the weights and body weight percentage of the collar 150 and/or collar weight 190 in various embodiments are not simply design choices and are instead specifically designed to generate a desired calming effect in the animal 101. An assertion otherwise would be improper hindsight reasoning in view of the present disclosure.

Also, in some embodiments, an animal calming vest system can comprise an animal calming vest 100 and a plurality of different collar weights 190 of different weights such that a user can select a desired weight of a collar weight 190 and couple the collar weight 190 within the collar 150 as discussed herein. In other words, some embodiments include an animal calming vest 100 where the weight of the collar 150 can be selectively changed by a user by removing a first collar weight 190 from the collar 150 and selecting a second collar weight 190 of a different weight and coupling the second collar weight 190 within the collar 150 as discussed herein. Providing a plurality of different collar weights 190 of different weights can be desirable to allow a user to select a collar weight 190 that generates the maximum calming effect in the animal 101 wearing the animal calming vest 100. Additionally, while various examples discussed herein can relate to animals 101 such as dogs, further embodiments can relate to cats, rabbits, goats, pigs, horses, cows, humans, or the like.

Figure 18:
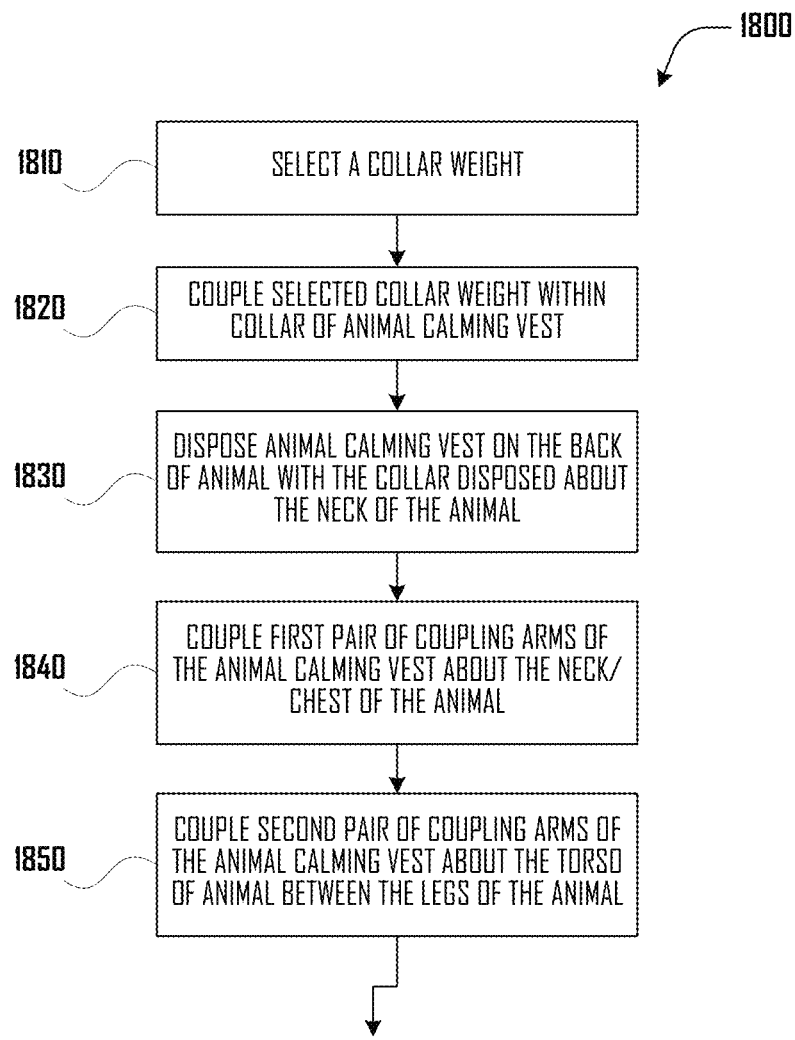
FIG. 18 illustrates a method of calming an animal with an animal calming vest.
Figure 20B:
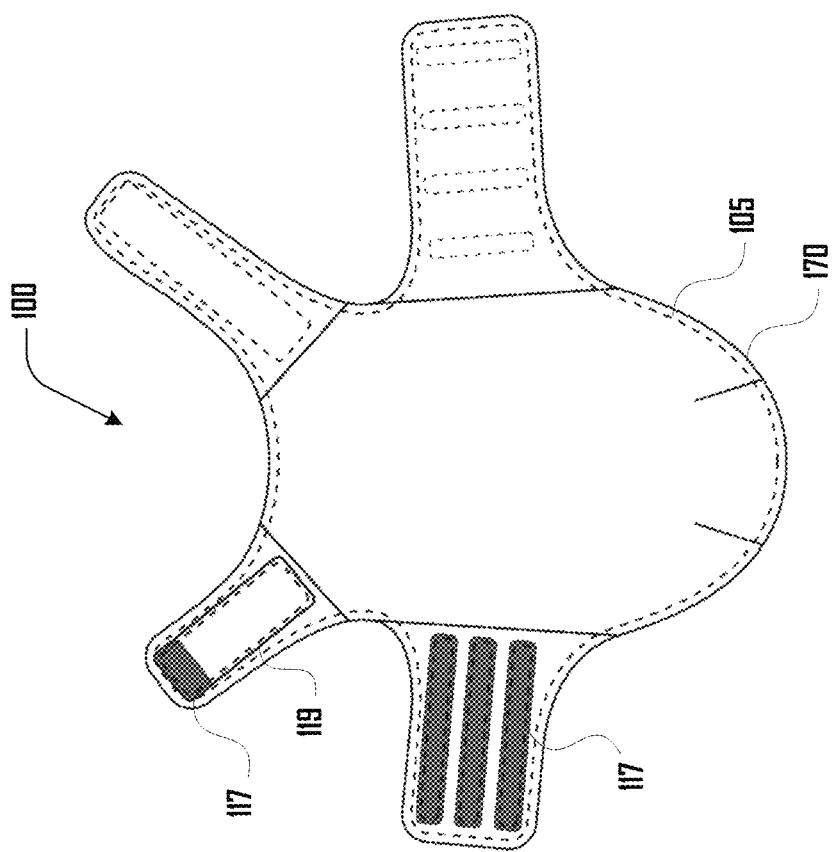
Figure 20A:
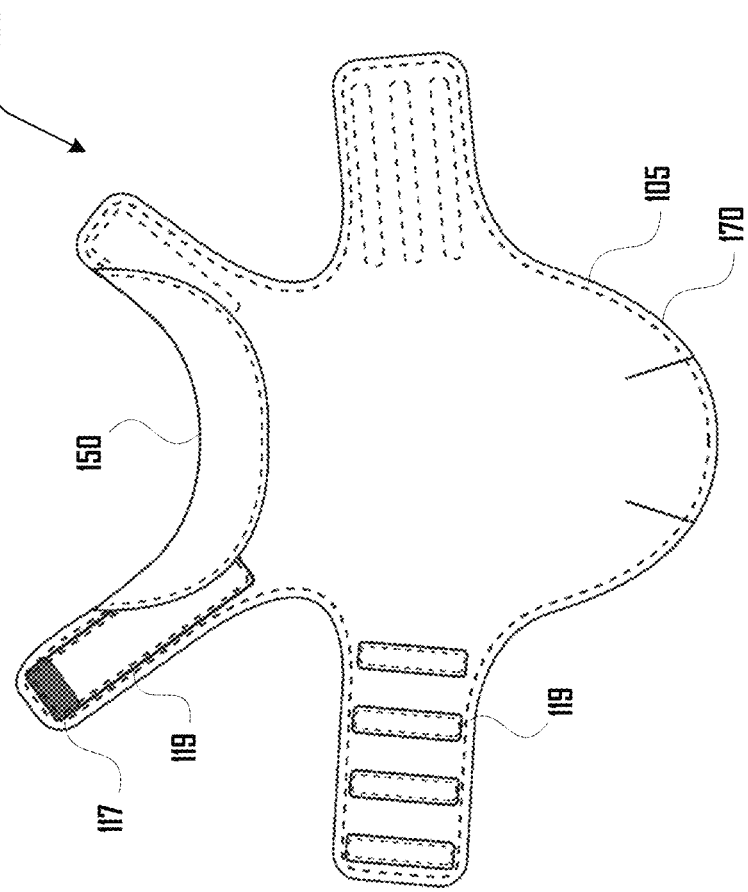
FIG. 20a illustrates a first side of another embodiment of an animal calming vest.

Turning to FIG. 18, a method 1800 of calming an animal 101 with an animal calming vest 100 is illustrated. The method 1800 begins at 1810 where a user (e.g., a human owner of an animal 101) selects a collar weight 190, which can include selecting a collar weight 190 from a set of one or more collar weights 190.

At 1820, the selected collar weight 190 is coupled within a collar 150 of an animal calming vest 100. For example, a user can open a collar body 152 that defines an internal collar cavity 154 via a collar zipper 156 and couple the selected collar weight 190 within the collar 150 via a collar weight zipper 194 of the collar 150 and/or collar weight 190.

The collar weight 190 can then be enclosed within the collar cavity 154 of the collar 150 by zipping the collar zipper 156 closed.

At 1830, the animal calming vest 100 can be disposed on the back of an animal 101 with the collar 150 disposed about the neck of the animal 101. For example, animal calming vest 100 can be disposed on the back of an animal 101 with a concave portion of the collar 150 surrounding the posterior neck area of an animal 101 with the plane of symmetry of the collar 150 generally disposed coincident with the spine of the animal 101 and laying over opposing sides of the spine about the posterior neck and back of the animal 101. The jacket 170 can be disposed draped over the back of the animal 101.

At 1840, a first pair of coupling arms 110A, 110B of the animal calming vest 100 are coupled about the neck/chest of the animal 101 such as shown in FIGS. 7, 8, 9a, 10a, 11a, 11b, 12a, 12b and 13-16. For example, the first pair of coupling arms 110 can comprise first-arm couplers 115 that include hook tape 117 and loop tape 119 that allow the first coupling arms 110 to be releasably coupled about the neck/chest of the animal 101 to accommodate the body size of the animal 101, desired snugness about the neck/chest of the animal 101, and the like.

At 1850, a second pair of coupling arms 130A, 130B of the animal calming vest 100 are releasably coupled about the torso of the animal 101 between the legs of the animal 101 such as shown in FIGS. 7, 8, 9a, 9b, 10a, 10b, 11b, 12b and 13-16. For example, the second pair of coupling arms 130 can include second-arm couplers 135 that can comprise hook tape 117 and loop tape 119 that allow the second coupling arms 130 to be releasably coupled about the torso of the animal 101 to accommodate the body size of the animal 101, desired snugness about the torso of the animal 101, and the like. Coupling the animal calming vest 100 about the animal can generate a calming effect in the animal as discussed herein.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. Additionally, elements of a given embodiment should not be construed to be applicable to only that example embodiment and therefore elements of one example embodiment can be applicable to other embodiments. Additionally, elements that are specifically shown in example embodiments should be construed to cover embodiments that comprise, consist essentially of, or consist of such elements, or such elements can be explicitly absent from further embodiments. Accordingly, the recitation of an element being present in one example should be construed to support some embodiments where such an element is explicitly absent.

EXAMPLE(S)

Methods and Materials

Figure 21:
FIG. 21 illustrates a modified fear, anxiety and stress scale.

A study was conducted wherein total of twenty companion dogs were recruited from three veterinary clinic staff members in Ottawa, Ontario, to participate in the study. Interested owners recognized their pets as experiencing mild to moderate levels of anxiety, in a predictable and repeatable situation. A well-defined fear, anxiety, and stress scale; "The Spectrum—Fear, Anxiety and Stress", (FAS scale) was developed by Fear Free Pets®, a highly valued and respected resource in Veterinary Medicine. The original FAS scale requires a user to classify their pet's anxiety level in one of eight categories of increasing intensity of fear, anxiety, and stress. Within each category exists additional identifiers of an animal's signs and level of fear, anxiety, and stress. Some of these signs overlap in more than one category which results in over forty body language signs to choose from. For this trial, a modified FAS scale was provided as shown in FIG. 21 to increase clarity and accuracy for owners using some of the more widely identifiable canine behaviour signs of fear, anxiety, and stress.

A calming vest in accordance with embodiments discussed herein were provided to the dog owners for the trial based on the weight of the dog in accordance with the sizing chart of FIG. 22. The dogs of the trial had the following weights in kilograms: 22.7, 5.6, 19, 28.5, 13.6, 24, 14, 24, 5, 6.35, 20, 9, 30, 22.2, 26, 22, 27, 18.14, 22, 32, 31.5, 2.5, 8, 17.

Before starting the trial, owners were asked to promote a positive association with the calming vest and their dog in order to encourage a positive emotional state. Owners could choose between introducing the calming product while feeding a preferred food treat or using the calming product when the pet was already resting or settled. Next, owners used the calming product in their specific identified and repeatable anxiety-provoking scenario. Owners repeated this last phase on three separate occasions, completing the trial form (see FIGS. 23 and 24) and documenting the anxiety level on the modified FAS scale each time.

Procedure

The study had the following procedures:
1. Identify predictable and repeatable anxiety-provoking scenario.
2. Create a positive association with the calming product.
3. Perform identified scenario without the use of the calming product to get a baseline of subject's anxiety level on the modified FAS scale and willingness to accept a treat. Complete trial form.
4. Perform the identified scenario for a second time with the use of the calming product on the subject. Complete trial form.
5. Perform the identified scenario for a third time with the use of the calming product on the subject. Complete trial form.
6. Perform the identified scenario for a fourth time with the use of the calming product on the subject. Complete trial form.

Results

Twenty companion animal dog owners completed all six steps in the trial with their dogs. Ninety-five percent of the participants reported a reduction in the dog's visual anxiety symptoms, claiming the calming vest had a positive and beneficial effect on reducing their dog's anxiety level. Specifically, using the FAS scale, seventy-five percent of the dogs showed an improvement (reduced level of stress/anxiety/fear) while wearing the vest. This latter result is a measure of a decrease in anxiety by one or more levels, as compared to the initial baseline observation of their dog in the identified predictable and repeatable anxiety-provoking situation. Additionally, owners commented subjectively to the question: "In your opinion, did the calming vest reduce the severity of your dog's anxiety? Please explain below." By the end of the trial, forty-five percent of the dogs showed a positive change in their willingness to accept a food treat while wearing the vest. This result demonstrated improvement from not accepting a food treat to accepting one with reluctance or, the dog accepting a treat typically, instead of with reluctance at baseline. Results of the tests are shown in FIG. 25.

What is claimed is:
1. A method of calming an animal with an animal calming vest, the method comprising:
    selecting a collar weight, the collar weight including:
        a collar weight body that is planar and generally crescent shaped with a convex edge and a concave edge and a central plane of symmetry,
        a collar weight zipper disposed along the concave edge of the collar weight body, and
        a plurality of weight units defined by the collar weight body that define separate cavities within the collar, defined at least in part by seams, in which one or more weights or weight material are disposed, the plurality of weight units extending radially from the concave edge of the collar weight,
        wherein the collar weight has a weight of between 0.24 lbs and 1.65 lbs with the weight being between 2.0% and 5.0% of the body weight of the animal, and the collar weight having a maximum width at the central plane of symmetry of greater than or equal to 9 cm;
    coupling the selected collar weight within an internal collar cavity of a collar of an animal calming vest via the collar weight zipper disposed along the concave edge of the collar weight body, the animal calming vest consisting essentially of:
        a jacket,
        a first pair of coupling arms extending from the jacket, the first pair of coupling arms comprising first-arm couplers including hook tape and loop tape that allow the first pair of coupling arms to be releasably coupled about the neck and chest of the animal to accommodate the body size of the animal and desired snugness about the neck and chest of the animal, the first pair of coupling arms having a minimum width of greater than or equal to 8 cm,
        a second pair of coupling arms extending from the jacket, the second pair of coupling arms comprising second-arm couplers including hook tape and loop tape that allow the second pair of coupling arms to be releasably coupled about the torso of the animal between the legs of the animal to accommodate the body size of the animal and desired snugness about the torso of the animal, the second pair of coupling arms having a minimum width of greater than or equal to 11 cm, and
        the collar extending from the jacket;
    enclosing the collar weight within the collar cavity of the collar by zipping a collar zipper closed to close the collar cavity;
    disposing the animal calming vest on the back of the animal with the collar disposed about the neck of the animal with a concave portion of the collar surrounding the posterior neck area of the animal and extending toward the front chest area of the animal, with a plane of symmetry of the collar disposed coincident with the spine of the animal and laying over opposing sides of the spine about the posterior neck and back of the animal, the jacket of the animal calming vest disposed draped over the back of the animal;
    releasably coupling the first pair of coupling arms of the animal calming vest about the neck and chest of the animal via the first-arm couplers; and releasably coupling the second pair of coupling arms of the animal calming vest about the torso of the animal and between the legs of the animal via the second-arm couplers, wherein coupling the animal calming vest about the animal generates a calming effect in the animal based at least in part on the weight of the collar generated by the collar weight within the collar cavity of the collar.

2. The method of claim 1, wherein the plurality of weight units are filled with sand that generates the weight of between 0.24 lbs and 1.65 lbs.

3. The method of claim 1, wherein the first pair of coupling arms, the second pair of coupling arms and the collar are made of the same material as the jacket and extend contiguously from the jacket with the same material as the jacket.

4. The method of claim 3, wherein both the first pair of coupling arms and the second pair of coupling arms do not include elements of a different material than the jacket aside from the first-arm couplers and the second-arm couplers, including not having straps, webbing, ropes, lines, and ribbons.

5. The method of claim 1, wherein both the first-arm couplers and the second-arm couplers only include hook-and-loop couplers, with couplers or coupling elements including a tie, clip, snap, latch and buckle being absent from both the first pair of coupling arms and the second pair of coupling arms.

6. A method of calming an animal with an animal calming vest, the method comprising:

coupling a collar weight within an internal collar cavity of a collar of the animal calming vest via a collar weight zipper disposed along a concave edge of a collar weight body;

enclosing the collar weight within the collar cavity of the collar by zipping a collar zipper closed to close the collar cavity;

disposing the animal calming vest on the back of the animal, the animal calming vest including:
a jacket,
a first pair of coupling arms extending from the jacket, the first pair of coupling arms comprising first-arm couplers including hook tape and loop tape that allow the first pair of coupling arms to be releasably coupled about the neck and chest of the animal to accommodate the body size of the animal and desired snugness about the neck and chest of the animal,
a second pair of coupling arms extending from the jacket, the second pair of coupling arms comprising second-arm couplers including hook tape and loop tape that allow the second pair of coupling arms to be releasably coupled about the torso of the animal between the legs of the animal to accommodate the body size of the animal and desired snugness about the torso of the animal,
the collar extending from the jacket, and
the collar weight disposed within the internal collar cavity of the collar, the collar weight including:
the collar weight body that is planar and generally crescent shaped with a convex edge and the concave edge and a central plane of symmetry,
the collar weight zipper disposed along the concave edge of the collar weight body, and
a plurality of weight units defined by the collar weight body that define separate cavities within the collar, defined at least in part by seams, in which one or more weights or weight material are disposed, the plurality of
weight units extending radially from the concave edge of the collar weight, wherein the animal calming vest is disposed on the back of the animal with the collar disposed about the neck of the animal with a concave portion of the collar surrounding the posterior neck area of the animal and extending toward the front chest area of the animal, with a plane of symmetry of the collar disposed coincident with the spine of the animal and laying over opposing sides of the spine about the posterior neck and back of the animal, the jacket of the animal calming vest disposed over the back of the animal;

releasably coupling the first pair of coupling arms of the animal calming vest about the neck and chest of the animal via the first-arm couplers; and releasably coupling the second pair of coupling arms of the animal calming vest about the torso of the animal via the second-arm couplers, wherein coupling the animal calming vest about the animal generates a calming effect in the animal based at least in part on the weight of the collar generated by the collar weight within the collar cavity of the collar.

7. The method of claim 6,
wherein the first pair of coupling arms have a minimum width of greater than or equal to 8 cm,
wherein the second pair of coupling arms have a minimum width of greater than or equal to 11 cm,
wherein the collar weight has a maximum width at the central plane of symmetry of greater than or equal to 9 cm,
wherein the collar weight has a weight of between 0.24 lbs and 1.65 lbs, and
wherein the weight of the collar weight is between 2.0% and 5.0% of the body weight of the animal.

8. A method of calming an animal with an animal calming vest, the method comprising:
disposing the animal calming vest on the back of the animal, the animal calming vest including:
a jacket,
a first pair of coupling arms extending from the jacket,
a second pair of coupling arms extending from the jacket,
a collar extending from the jacket, and
a collar weight disposed within an internal collar cavity of the collar, the collar weight coupled within the internal collar cavity of the collar of the animal calming vest via a collar weight coupler disposed along an edge of a collar weight body of the collar weight, the collar weight enclosed within the internal collar cavity of the collar by closing a collar closure to close the internal collar cavity;

releasably coupling the first pair of coupling arms of the animal calming vest about the neck and chest of the animal; and releasably coupling the second pair of coupling arms of the animal calming vest about the torso of the animal, wherein coupling the animal calming vest about the animal generates a calming effect in the animal.

9. The method of claim 8, wherein the first pair of coupling arms comprise first-arm couplers including hook tape and loop tape that allow the first pair of coupling arms to be releasably coupled about the animal.

10. The method of claim 8, wherein the second pair of coupling arms comprise second-arm couplers including hook tape and loop tape that allow the second pair of coupling arms to be releasably coupled about the animal.

11. The method of claim 8, wherein the collar weight comprises a collar weight body that is planar and generally crescent shaped with a convex edge and a concave edge and a central plane of symmetry.

12. The method of claim 8, wherein the collar weight comprises a collar weight zipper disposed along an edge of the collar weight.

13. The method of claim 8, wherein the collar weight comprises a plurality of weight units that define separate cavities within the collar, defined at least in part by seams, in which one or more weights or weight material are disposed.

14. The method of claim 13, wherein the plurality of weight units extend radially from an edge of the collar weight.

15. The method of claim 8, wherein the collar weight has a weight between 2.0% and 5.0% of the body weight of the animal.

16. The method of claim 8, wherein the animal calming vest is disposed on the back of the animal with the collar disposed about the neck of the animal surrounding the posterior neck area of the animal and extending toward the front chest area of the animal.

17. The method of claim 8, wherein a plane of symmetry of the collar is disposed coincident with the spine of the animal and laying over opposing sides of the spine about the posterior neck and back of the animal.

18. The method of claim 8, wherein the releasably coupling the first pair of coupling arms of the animal calming vest about the neck and chest of the animal is via first-arm couplers; and wherein the releasably coupling the second pair of coupling arms of the animal calming vest about the torso of the animal is via second-arm couplers.

19. The method of claim 8, wherein coupling the animal calming vest about the animal generates a calming effect in the animal based at least in part on weight of the collar generated by the collar weight within the collar cavity of the collar.

* * * * *